US008224783B1

(12) United States Patent
Burleigh et al.

(10) Patent No.: US 8,224,783 B1
(45) Date of Patent: Jul. 17, 2012

(54) INFORMATION MANAGEMENT SYSTEM

(75) Inventors: Dexter A. Burleigh, Cypress, TX (US);
Dominique P. Berta, Katy, TX (US);
Jerry C. Phillips, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 2090 days.

(21) Appl. No.: 09/724,606

(22) Filed: Nov. 28, 2000

Related U.S. Application Data

(60) Provisional application No. 60/235,539, filed on Sep. 26, 2000.

(51) Int. Cl.
*G06F 17/30* (2006.01)
(52) U.S. Cl. ......... 707/654; 707/792; 707/803; 707/804
(58) Field of Classification Search .................. 707/104, 707/200, 203, 104.1, 654, 792, 803–804; 705/35.37; 702/13, 9–10
See application file for complete search history.

(56) References Cited

U.S. PATENT DOCUMENTS

| | | | | | |
|---|---|---|---|---|---|
| 5,148,365 | A | * | 9/1992 | Dembo | 705/36 |
| 5,475,589 | A | * | 12/1995 | Armitage | 702/13 |
| 5,871,053 | A | * | 2/1999 | Stern | 166/401 |
| 5,893,079 | A | * | 4/1999 | Cwenar | 705/36 |
| 5,930,762 | A | * | 7/1999 | Masch | 705/7 |
| 6,014,343 | A | * | 1/2000 | Graf et al. | 367/38 |
| 6,078,905 | A | * | 6/2000 | Pich-LeWinter | 705/36 |
| 6,230,828 | B1 | * | 5/2001 | Beuershausen et al. | 175/431 |
| 6,256,640 | B1 | * | 7/2001 | Smalley et al. | 707/104.1 |
| 6,282,452 | B1 | * | 8/2001 | DeGuzman et al. | 700/32 |
| 6,338,067 | B1 | * | 1/2002 | Baker et al. | 707/100 |
| 6,341,291 | B1 | * | 1/2002 | Bentley et al. | 707/203 |
| 6,373,489 | B1 | * | 4/2002 | Lu et al. | 345/428 |
| 6,438,545 | B1 | * | 8/2002 | Beauregard et al. | 707/6 |
| 6,449,624 | B1 | * | 9/2002 | Hammack et al. | 707/203 |
| 6,484,151 | B1 | * | 11/2002 | O'Shaughnessy | 705/36 |
| 6,959,268 | B1 | * | 10/2005 | Myers, Jr. et al. | 703/6 |
| 2005/0108139 | A1 | * | 5/2005 | Sperandeo | 705/36 |

OTHER PUBLICATIONS

Merak Web-Software-FieldView, "Fieldview Simplifies Field Data Collection and Analysis for Oil and Gas Facilities" Printed from internet, Oct. 1, 2000, 5 pages.

(Continued)

*Primary Examiner* — Hanh Thai
(74) *Attorney, Agent, or Firm* — Conocophillips Company

(57) ABSTRACT

The invention provides a system and method for managing related information generated by a plurality of individuals. The information management system includes a data repository adapted to store related data tied to a key parameter field, and at least one application server coupled to the data repository and adapted to provide a plurality of applications to a plurality of users. Each of the applications is adapted to generate at least some data having the key parameter field, and the at least one server is adapted to retrieve and update data when any one of the applications uses and generates data having the key parameter field. The method for managing information includes serving a plurality of applications to respective users, wherein the applications are adapted to generate data tied to a key parameter field. The method also includes storing the data generated by each application and updating any of the data having the key parameter field when one of the applications is used to modify any of the stored data having the key parameter field. The method also includes serving the updated data to any of the other applications when the application retrieves the data having the key parameter field.

7 Claims, 17 Drawing Sheets

OTHER PUBLICATIONS

Lewis, Jonathan and Hightower, Lee; "T2B: Next Great Productivity Breakthrough in Upstream Oil and Gas", Landmark Graphics Corporation, not dated; pp. 1-16.

Landmark Proven Solutions—DIMS for Windows, "Drilling Data Collection and Analysis System" Printed from internet, Oct. 1, 2000, 2 pages.

Merak Web—Software—VOLTS ; "VOLTS volume Tracking System Designed to Accurately Model and Report a Company's Reserves Volumes" Printed from internet, Oct. 1, 2000, 4 pages.

Merak Web—Software—Capital Planning, "Capital Planning Decision Support for the Corporate Planning Process" Printed from internet, Oct. 1, 2000, 4 pages.

Merak Web—Software- Peep, "Peep Global Petroleum Economic Evaluation and Decline Analysis" Printed from internet, Oct. 1, 2000, 6 pages.

Merak Web—Software—PetroDesk, "PetroDesk—Merak's Desktop Integration and Mapping Application" Printed from internet, Oct. 1, 2000, 4 pages.

Berta, Dominique and Burleigh, Dexter, A., "Innovative IT Tools Help Manage Extensive Field Operations, With up to 14 rigs drilling more than 200 wells a year, a Conoco business unit has designed, built and integrated information technology tools to better manage its asset portfolio"World Oil, Jan. 2000, pp. 55-58, 61.

RRC: Electronic Filing, "Railroad Commission of Texas, Electronic Filing" Printed from internet, Nov. 17, 2000, 6 pages.

Humphries, Guy, P.E., "Business Management Systems, T2B Integration and ARIES Economics" Undated, pp. 1-10.

Dr. Jonathan Lewis and Lee Hightower; "T2B: Next Great Productivity Breakthrough in Upstream Oil and Gas"; Landmark Graphics Corporation; pp. 1-15; 2000 (19 pgs.).

Paul Carragher, *Factors shapinig an oil majors exploration portfolio in a mature basin—BP acreage management in the UK North Sea* 20 pages.

Saudi-US Relations Information Service, Saudi Arabia's Oil Reserves—Overview, Future of Global Oil Supply: Saudi Arabia, a Conference Hosted at the Center for Strategic and International Studies, Feb. 24, 2004, www.saudi-us-relations.org/energy/saudi-energy-reserves.html, pp. 1-4.

\* cited by examiner

INFORMATION MANAGEMENT SYSTEM

CROSS REFERENCE TO RELATED APPLICATIONS

This application claims priority under Section 119 of U.S. Provisional Application No. 60/235,539, filed on Sep. 26, 2000.

FIELD OF THE INVENTION

The invention relates to the management of data used by more than one software application in a computer network environment. More specifically, the invention provides a system and method for managing information relevant to a petroleum portfolio. In particular, the invention provides a database management system that integrates information and data from a large cross-section of technical, financial, land operation, and regulatory functions for managing petroleum producing assets.

BACKGROUND OF THE INVENTION

The flow of information between individuals responsible for various technical and/or administrative functions within an organization is typically facilitated by weekly or monthly meetings, email communications, and through individual conversations. As a result, the flow of information for an individual in the organization will typically include: (1) collecting relevant information 10 generated by other individuals having related job functions; (2) generating information 12 relevant to a respective job function; (3) generating a report 14 summarizing respective information generated; and (4) meeting with other individuals 16 to report or transfer information. This type of information flow scheme is illustrated in FIG. 1.

For organizations comprising many individuals which generate information pertinent to defining, developing, and/or managing the organization's business or portfolio, the above described information flow methods can be extremely time consuming and difficult to coordinate. As a result, the use of these information flow methods can result in the ineffective management or mismanagement of the assets and portfolio of the organization. Therefore, a new method and system are needed for managing information generated by numerous individuals, typically using a plurality of application tools.

One example of this need is in coordinating petroleum operations, wherein it is important that each person in an asset development team has access to the most current information from not only his or her area but from all members of the team. Functions related to defining and developing a hydrocarbon-producing portfolio are typically separated into groups, referred to as functional groups. Each functional group comprises one or more individuals responsible for particular technical and/or administrative functions related to the development and management of the portfolio. The timely and accurate flow of information between these groups is important to efficient operations. Prior art business flow between these groups in the petroleum industry is based on paper data or electronic spreadsheets generated by individuals for their own use and located in various folders and drives on different computer systems. As a result, frequent business meetings are usually required to transfer this information between persons who perform the various business functions involved in the operation of the assets in the portfolio. At these meetings the various individuals typically discuss the status of their work while the other professionals note aspects of the reports that affected their functions and the duties they performed. This type of environment creates communication problems and is dependent upon human rapport and availability.

Other types of data flow known in the art include having individuals fill out selected forms used by various departments within the organization operating the portfolio. For example, the individuals may include Geologists and Geophysicists who generate drilling prospects, Regulatory and Right-of-Way professionals who ensure compliance with laws and regulations affecting the operation, Landmen who ensure that lease obligations are met by drilling prospects and existing wells, Drilling engineers who design wells to be drilled on the prospects, Financial Analysts who plan budgets for asset development, and Managers who decide how best to allocate financial resources to develop assets according to the organization's financial goals.

In large operations, such as those that involve the drilling of large numbers of wells for fixed resources (limited number of rigs, limited budgets, other capital limitations) in a certain time frame, efficiency of time, equipment use and resources is important. In this type of environment, the traditional method of conducting meetings to discuss the status of several wells can be inefficient and difficult to coordinate because mutually agreeable times must be found when everyone involved in the operation can meet. Further, the effectiveness of such meetings is largely based on human rapport. Additionally, meetings involving several operations can be time consuming, in that time is spent discussing issues which relate to only a few individuals, having each person to present reports, and answering questions from one or two individuals in a group setting. In many cases, these meetings consume valuable time that could have been better spent working in the office or field.

Prior art tools used in this type of environment typically include a number of specific application programs that are used by the various individuals in the asset development organization. Each of the applications is typically specific to an individuals role and function. For example, Geologists and Geophysicists have applications for interpreting 3-dimensional seismic surveys, and for indicating prospects thereon generated as a result of the interpretation. Reservoir Engineers have applications available which provide well test analysis and production forecasting. Drilling Engineers have available well design tools which facilitate design of wells to be drilled given formation parameters and depths to selected targets. Landmen have available applications which facilitate tracking of petroleum lease obligations, to make it easier to ensure that all obligations have been accounted for in the organization's business activity. These are not meant to be an exhaustive list of applications and their users in petroleum organizations, but are provided only to illustrate the complexity of asset development organizations.

A limitation of the applications known in the art is that each generates unique data sets. Most of the applications known in the art do not provide any facility for data generated by one application to be used in any other application other than by manual entry such as by keyboard, manually operated download or other non-automatic device. Therefore there is a need for a system and method which provide automatic update of data commonly used in a number of different applications across an organization in order to reduce the need to repetitively enter data, or provide other forms of manual data transfer.

SUMMARY OF THE INVENTION

In one aspect, the invention provides an information and knowledge management system. The system includes a data repository adapted to store related data tied to a key parameter field and at least one application server adapted to provide a plurality of applications to a plurality of different users. The application server is operatively coupled to the data repository. Each of the applications is adapted to generate at least some data having the key parameter field. The application server is adapted to retrieve and update selected ones of the related data when any one of the applications uses and generates application data having the key parameter field.

In another aspect, the invention provides a management system for a portfolio of hydrocarbon-producing opportunities. This system includes at least one server adapted to serve a plurality of applications to respective users. Each of the applications is adapted to generate data corresponding to the respective user. At least some of the data generated by each application has a key parameter field therein. The system further includes a database management system (DBMS) operatively coupled to the at least one server. The database management system is adapted to store at least some of the data generated by each application and update any of the stored data having the key parameter field. The at least one server is adapted to serve the updated data to any other applications when the other applications retrieve the updated data having the key parameter field. Additionally, the system includes at least one business process model application adapted to apply a business process model to selected ones of the stored data to generate modeled data having the key parameter field. The at least business process model application is adapted to automatically update the modeled data when selected ones of the stored data are updated by operation of any of the other applications.

In another aspect, the invention provides a method for managing information and business unit knowledge. The method includes serving a plurality of applications to respective users, wherein each application generates data corresponding thereto. At least some of the data generated includes a key parameter field. The method further includes storing the data generated by each application and updating any of the data having the key parameter field when one of the applications is used to modify any of the data having the key parameter field. The method additionally includes serving the updated data to any other one of the applications when the other one of the applications retrieves from storage the data having the key parameter field.

In another aspect, the invention provides a method for managing a portfolio of hydrocarbon-producing opportunities. The method includes having a plurality of functional groups each using an application related to the function of each of the functional groups, wherein each application generates data relevant thereto. The method further includes automatically updating corresponding data in any other ones of the applications based on the data generated by using one of the applications. The asset team members include at least two selected from Geoscientists, Landmen, Reservoir Engineers, Production Engineers, Facility Engineers, Regulatory Compliance Administrators, Right-of-Way Administrators, Material and Logistics Specialists, Drilling Engineers, Completion Engineers, Finance Analysts, Field Operators, Sales and Marketing Representatives, and Portfolio Managers.

Other aspects and advantages of the invention will become apparent from the description and claims which follow.

DETAILED DESCRIPTION

To facilitate an understanding of the invention, the invention will now be described with reference to particular embodiments and an example of implementation and use for managing information and knowledge for a portfolio of hydrocarbon-producing opportunities. From the description, it will be apparent to those skilled in the art that the practical applications of the invention are not limited to these particular embodiments. Rather, the principles of the invention are applicable to managing any type of information and knowledge and may be implemented using any type of computer network scheme, including terminal server environment, local-area networks (LANs), wide-area networks (WANs), the Internet, intranets, or any combination thereof.

The invention provides a system and method wherein information generated by one user's application is automatically provided as input into another user's application. Using the invention, an individual may only be required to generate data in order for that data to be transferred or made readily available to other individuals throughout the organization.

Figure 1:
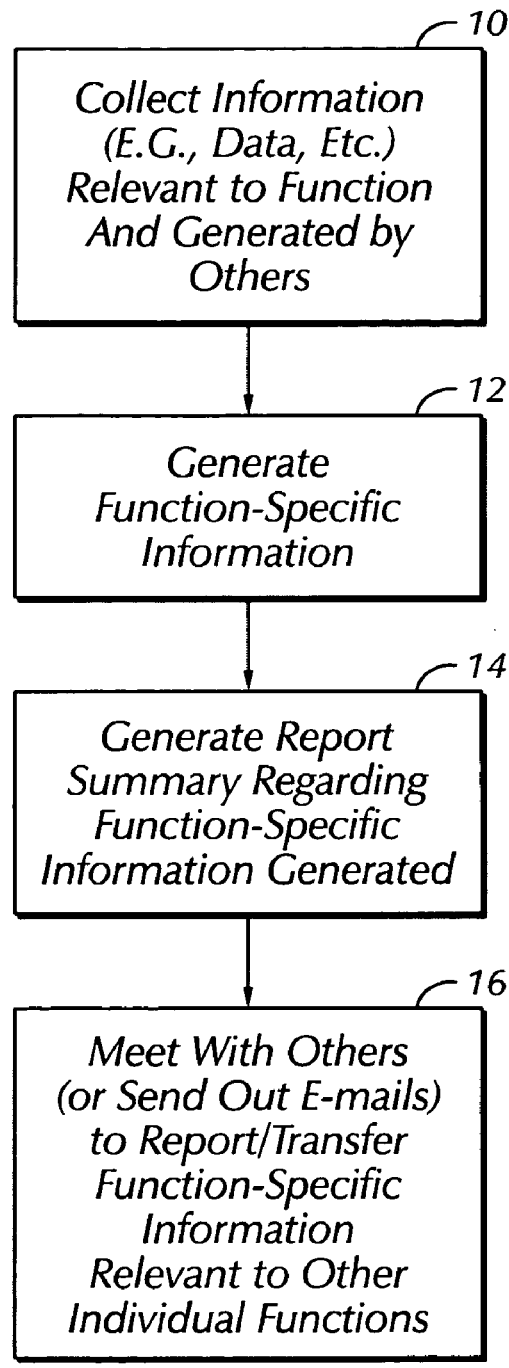
FIG. 1 shows one example of typical steps involved in the prior art information flow between individuals in an organization.
Figure 2:
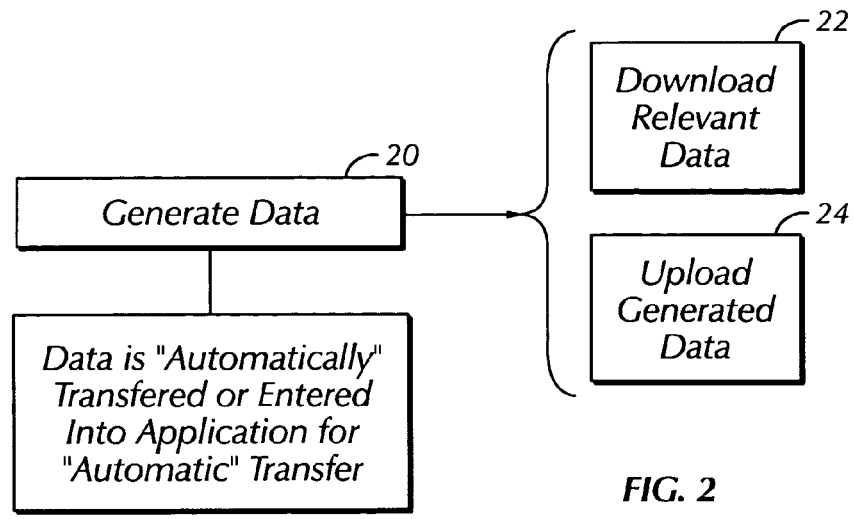
FIG. 2 shows one example of the step involved in information flow between individuals in an organization in accordance with the present invention.

Thus, as illustrated for example in FIG. 2, an individual may use his respective software application to generate data 20. This may include downloading relevant data 22 generated by others from a common data repository, generating related data, and then uploading newly generated data 24 to the common data repository, thereby making it readily available to others.

Figure 3:
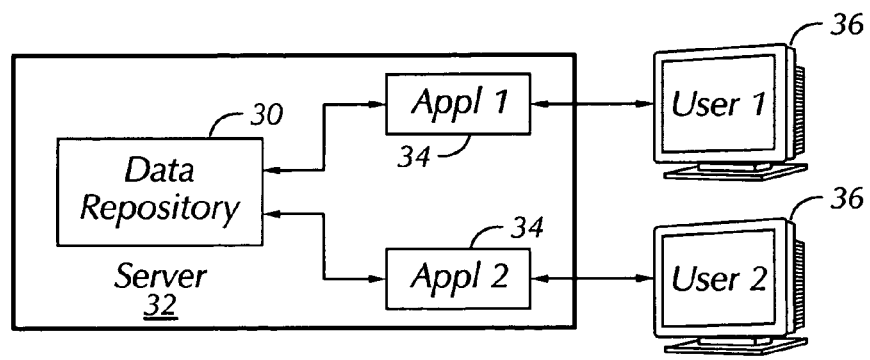
FIG. 3 is an illustration of one embodiment of an information management system in accordance with the invention.
Figure 4:
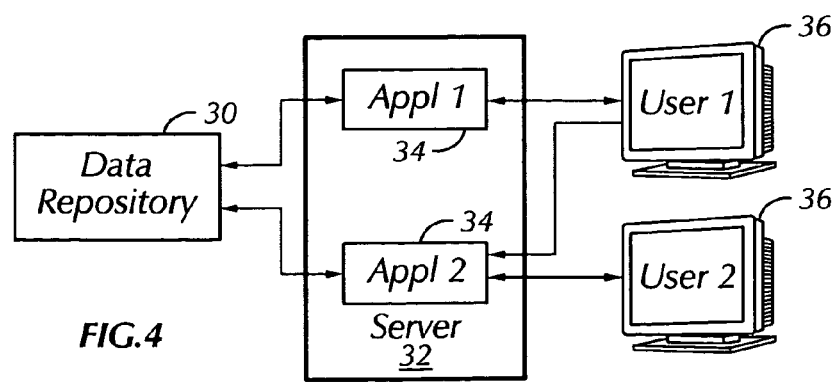
FIG. 4 is an illustration of another embodiment of an information management system in accordance with the invention.
Figure 5:
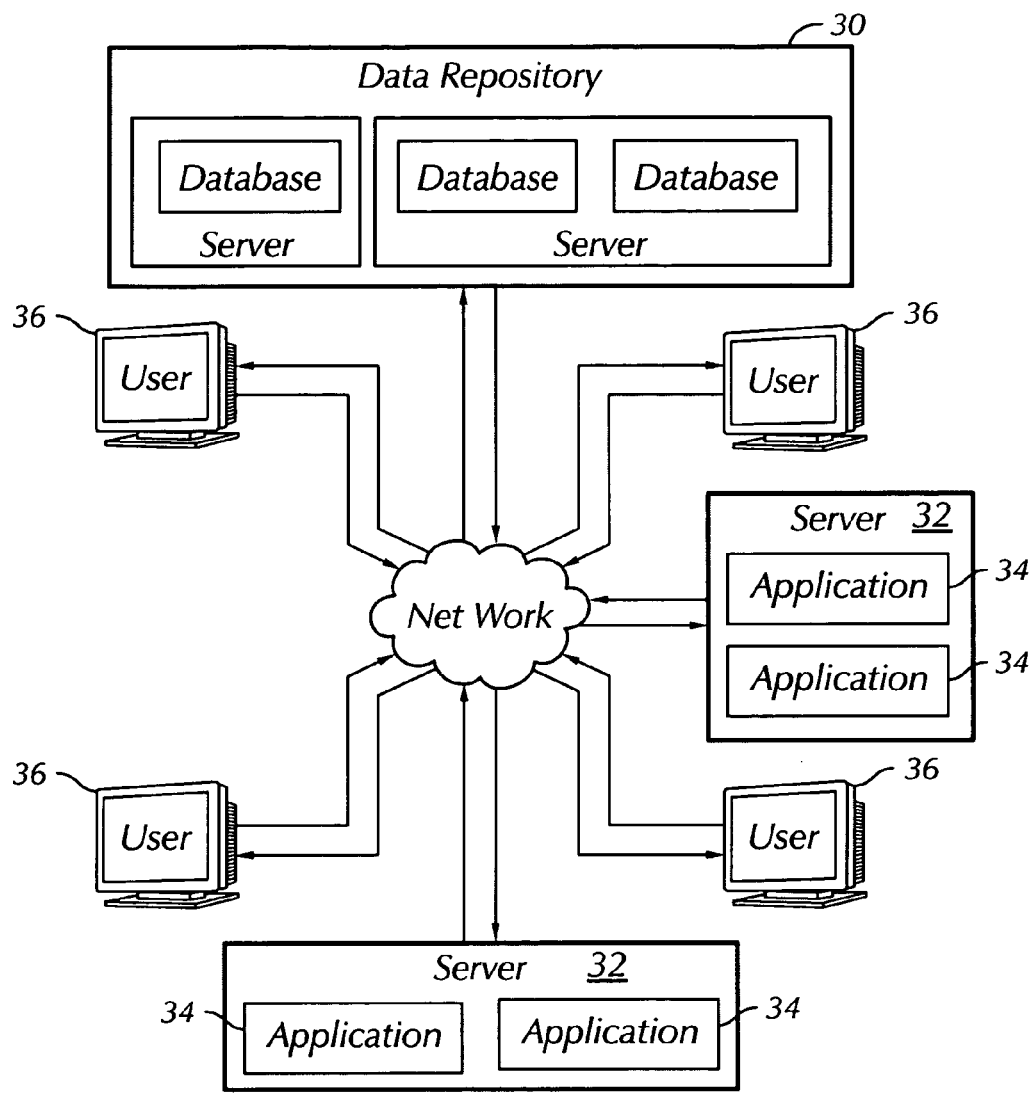
FIG. 5 is an illustration of another embodiment of an information management system in accordance with the invention.

Referring to FIGS. 3-5, in accordance with one aspect of the invention, an information and knowledge management system comprises a data repository 30 adapted to store related data tied to a key parameter field, and an application server 32 adapted to provide a plurality of applications 34 to a plurality of different users 36. The application server is operatively coupled to the data repository 30. Each of the applications 34 is adapted to generate at least some data having the key parameter field. The application server 32 is adapted to retrieve and update selected ones of the related data when ones of the applications 34 are used to generate data having the key parameter field. In some embodiments, this retrieval and/or update may occur automatically. The data repository 30 may be adapted to store all data generated by each of the applications 34 or only selective data generated by the application 34. Additionally, the data repository 30 may comprise a single database or a plurality of databases wherein each of the plurality of databases is adapted to store data from one or more respective applications, as illustrated in FIG. 5.

The server 32 may comprise a single application server, or a plurality of servers operatively connected to the data repository 30. For example, the plurality of applications 34 may reside on the same server 32, as shown in FIG. 3 and FIG. 4, or on a plurality of servers each server being accessible to one or more users 36 and operatively connected to the data repository 30 such that data can be communicated between the plurality of applications 34 and the data repository 30. Additionally, the data repository 30 may be located on the same server 32 as one or more applications 34 as shown in FIG. 3, or at a different location and in communication with the server 32 and applications 34, as illustrated, for example, in FIG. 4 and FIG. 5. It should also be understood that in some embodiments, such as the ones illustrated in FIG. 4 and FIG. 5, users 36 may have access to other user's applications 34 or may share applications 34 without departing from the spirit of the invention.

In one embodiment, the related data stored in the data repository 30 may comprise data (data, work product, information, etc.) relevant to assets and/or opportunities in a portfolio. In this case, the plurality of users 36 may comprise different members of an asset development team responsible for different aspects of developing assets and/or opportunities in the portfolio and, thus, the generation of different data relevant to the portfolio. The data pertaining to each asset/opportunity in the portfolio is, preferably, stored in a distinct record or set of records linked or tied together by key parameter fields. A unique key parameter field is, preferably, used to distinguish asset/opportunity records from each other. For example, all data related to a particular asset may be linked to a unique asset identification code which can be referenced to retrieve or update data related to that particular asset.

Members of the asset development team may use different applications 34 to generate their individual work product. For example, an accountant may use an accounting application specific to his job function, and a marketing representative may use a forecast application specific to his job function. In order for data generated by each application to be properly stored in the data repository 30, data generated should include an "identifier" or "tag" indicating which asset/opportunity or record the data corresponds to, so that the data can be linked to the appropriate record in the data repository 30. A key parameter field may be included in the data as a "tag" by the application 34 when generated or may be added to the data by another application after being generated. For example, data may be generated by an application 34 and stored in a data file corresponding to that application 34. Then, another application 34 may be used, such as one or more database management applications, to extract data from the data file, assign it a key parameter field, and then, based on the assigned key parameter field, store it in the data repository 30 properly linked to its related data.

Figure 6:
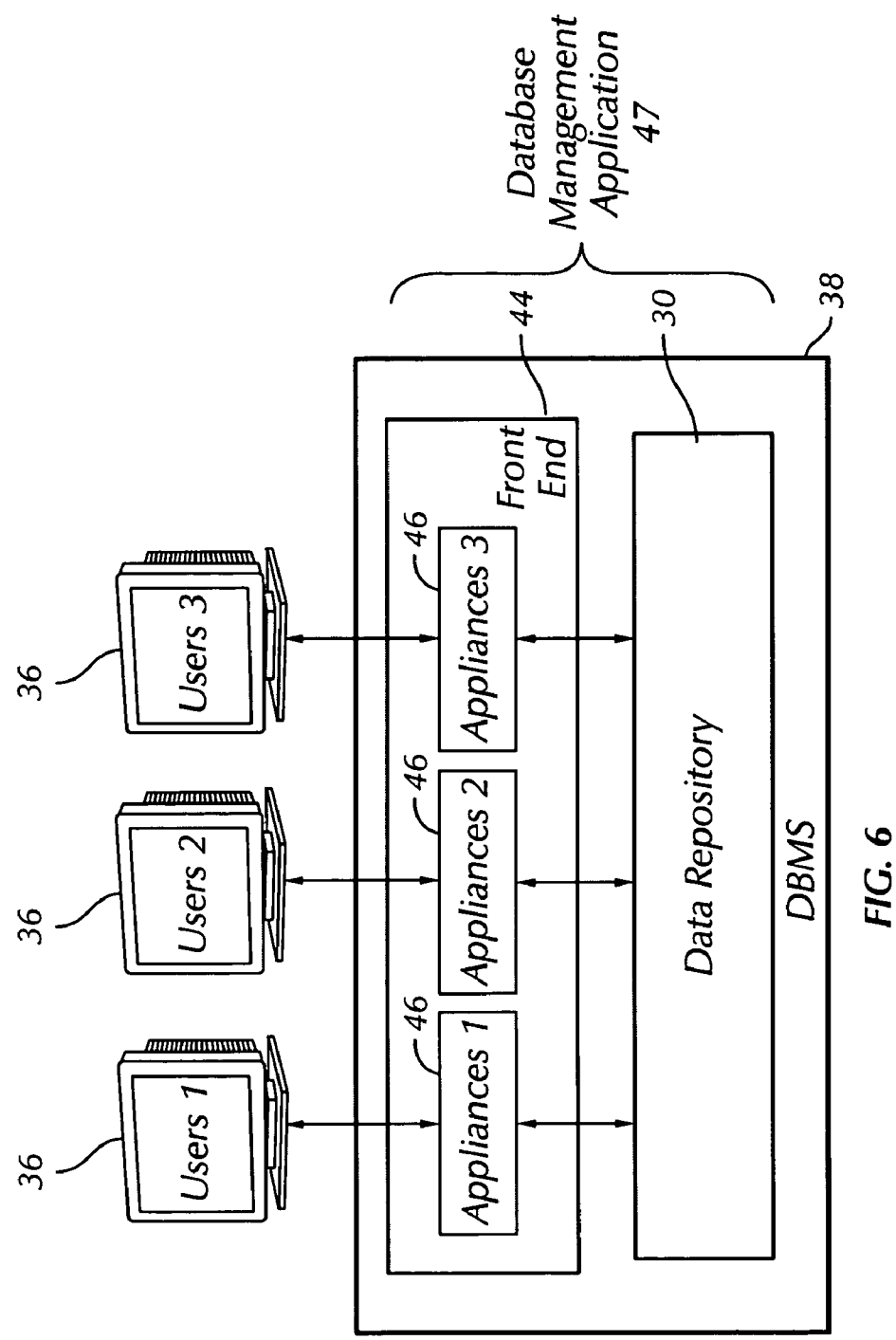
FIG. 6 is an illustration of a database management system comprising a front-end user interface in accordance with one embodiment of the invention.
Figure 7:
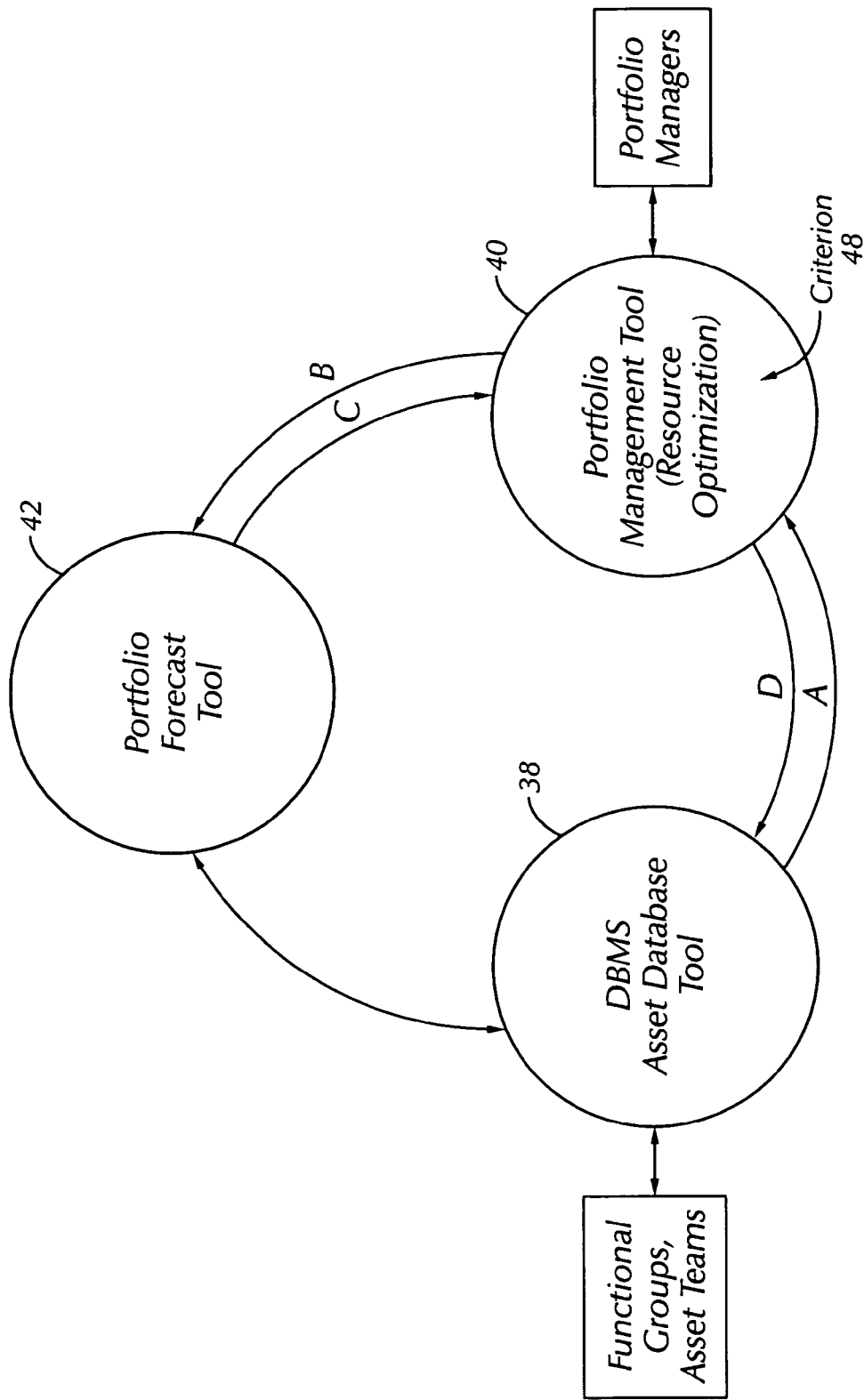
FIG. 7 shows one illustration of one embodiment of the invention comprising a data storage manager (DSM), a portfolio management tool, and a portfolio forecast tool.

As shown in FIG. 7, in one embodiment, the plurality of applications 34 provided to users may comprise, for example, a database management application 47 (as part of a database management system (DBMS) 38), a portfolio management application 40, and a portfolio forecast application 42. Referring to FIG. 6, the database management application 47 may comprise part of a database management system 38 which includes a front-end user interface 44 operatively coupled to the data repository 30 and adapted to generate data having a key parameter field for storage in the data repository 30. The front-end user interface 44 may comprise a single application 46 or a plurality of different applications 46, each directed to particular users 36, such as particular members on an asset development team having particular job functions resulting in the generation of portfolio relevant data. Alternatively, the database management application 47 may link to other applications to extract data generated by the other applications.

Figure 9:
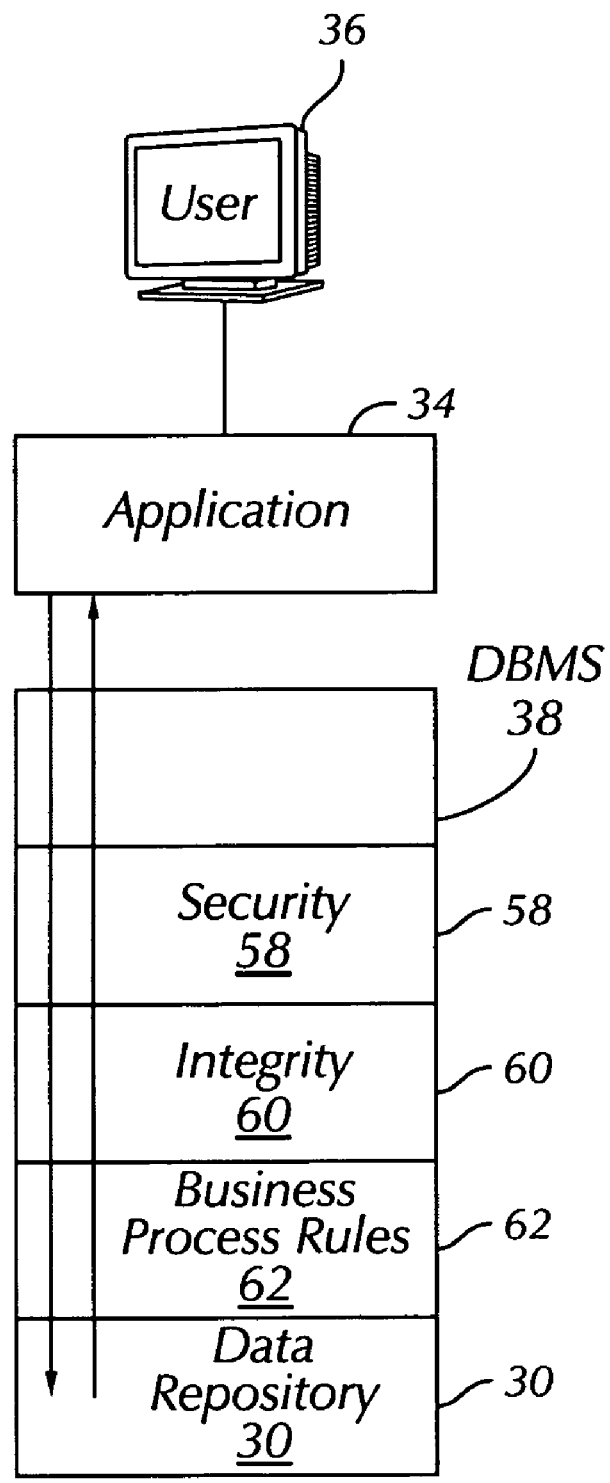
FIG. 9 is an illustration of one embodiment of a database management system comprising security and integrity features.

As illustrated in FIG. 9, the database management system 38, preferably, comprises means for maintaining data repository security 58 to ensure that unauthorized users do not gain access to the data in the data repository 30. For example, the application(s) comprising the front-end user interface (44 in FIG. 6) may require usernames and passwords which match authorized user profiles before permitting access to the data in the data repository 30.

As further illustrated in FIG. 9, the database management system 38 may also comprise means for ensuring or maintaining data integrity 60. For example, the user profiles may include indication of each user's function (e.g., technical or administrative function), which may be used to restrict users 36 from altering data outside of their assigned function, thereby insuring data integrity. Data integrity may also be ensured by embedding within the system "business process rules" 62 which may set boundaries for values of particular data that may be entered into different fields. For example, the system may not permit data values exceeding 100% to be stored as the amount of interest the organization has in a particular asset. Additionally, business process rules 62 may be applied to automatically calculate certain data values based on values for related data and selected standard business formulas. For example, a business-standard formula may be used to automatically calculate estimated project costs based on equipment list data and standard cost tables to ensure the uniformity and integrity of estimated costs data throughout the organization.

Referring to FIG. 7, the portfolio management application 40 may comprise a resource optimization tool 40 which uses data retrieved from the data repository 30 to generate an optimized allocation of resources based on one or more select criteria 48. The criteria 48 may be embedded in the optimization tool 40 and selected by the user, or retrieved from storage. The selected criteria 48 may comprise, for example, capitalizing on or developing the most profitable properties or assets first, achieving a selected net cash flow, achieving a selected level of earnings, achieving a selected level of production, satisfying particular obligations on time, or developing assets to achieve the greatest net cash flow in a selected amount of time for a select amount of capital. Once a schedule indicating the optimized allocation of resources is generated, this schedule may be stored in the data repository (30 in FIG. 6) and made available for viewing by the selected users on the asset team so appropriate action can be taken to conform to the optimized schedule. This schedule may also be emailed or otherwise communicated to selected users so that immediate adjustments to resource allocations can be made, if needed.

The portfolio forecast application 42 may comprise a forecasting tool adapted to forecast future performance of assets based on past performance data and other related data. For example, given the proposed optimized resource allocation schedule generated using the portfolio optimization tool 40, industry forecasting techniques can be applied to the proposed schedule to predict resulting portfolio performance. For the particular example of predicting future production for a portfolio of hydrocarbon-producing opportunities, commercially available forecasting applications, such as forecasting software sold by Merak, Schlumberger Geoquest, or Landmark, may be used. The portfolio forecast application 42 may be used in combination with a portfolio resource optimization tool 40 to iteratively determine the portfolio resource allocation scenario resulting in the best predicted performance of the portfolio for the given selected criteria 48. Advantageously, providing an information management system which dynamically captures portfolio relevant data generated by asset team members and makes it commonly accessible to other team members as well as to other portfolio management tools can significantly streamline information flow in an organization and increase the effective management of the organization's portfolio.

Figure 8A:
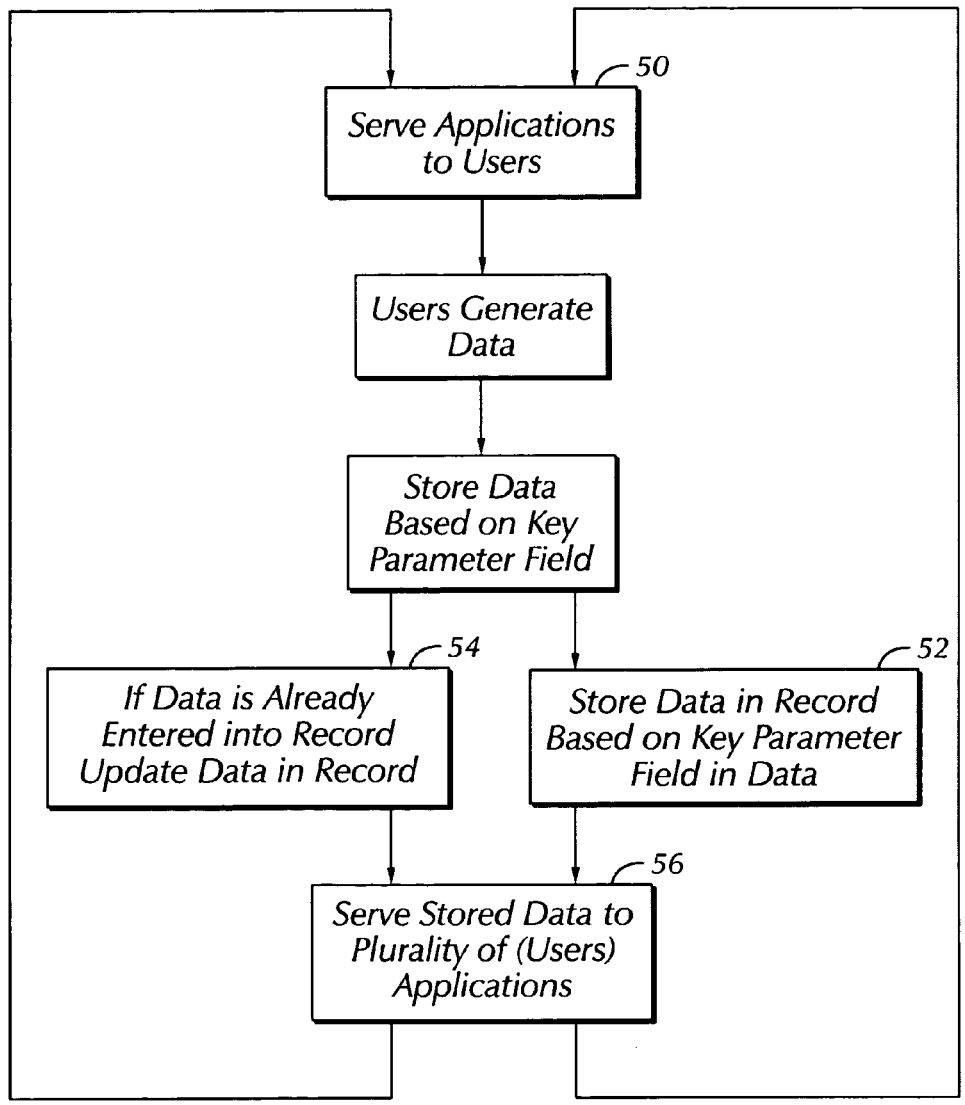
FIG. 8A shows a flow chart for one embodiment of a method for managing information.
Figure 8B:
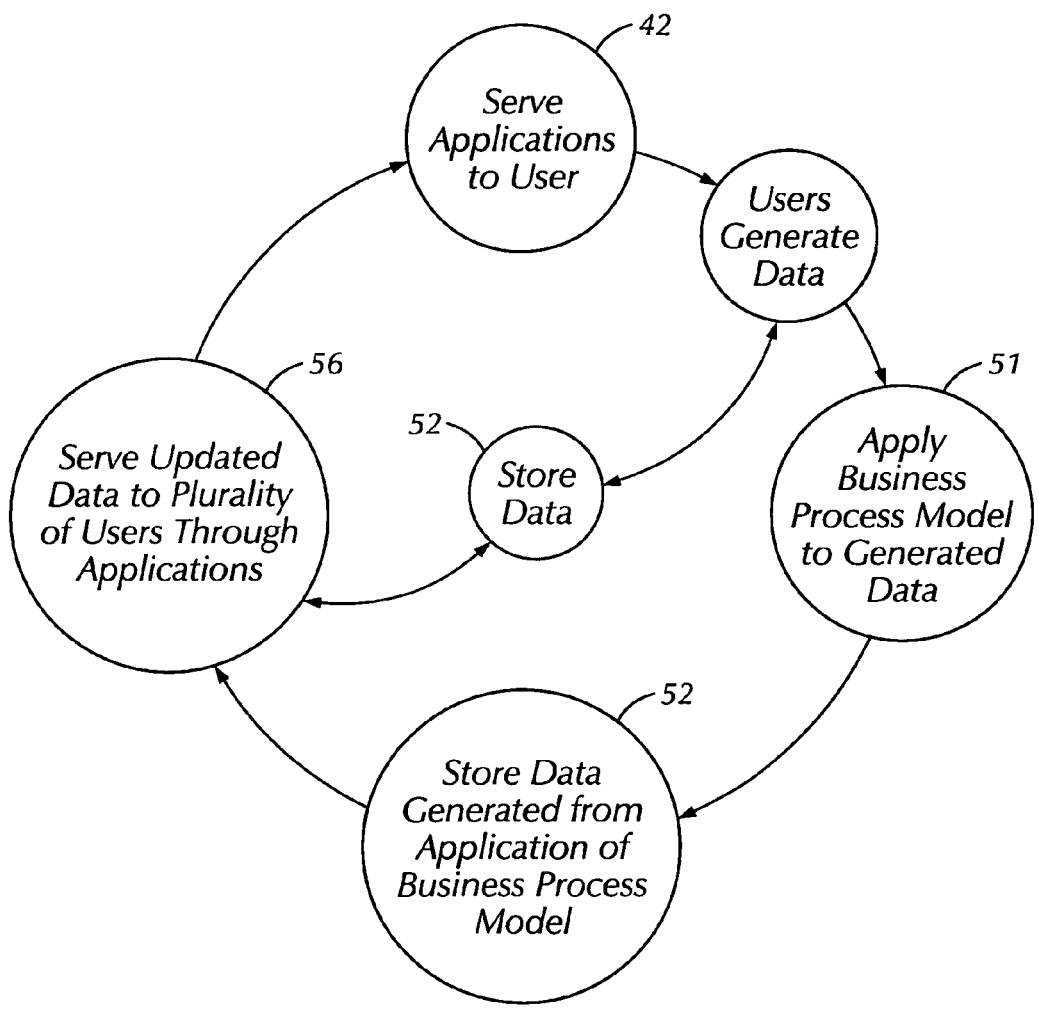
FIG. 8B shows a flow chart for another embodiment of a method for managing information.

Referring to FIG. 8A, in accordance with another aspect of the invention, a method for managing information comprises serving 50 a plurality of applications to respective users, wherein each of the applications is used by the respective user to generate data corresponding to that respective user's job function. At least some of the data generated by each of the applications includes or is tied to a key parameter field. The method further comprises storing 52 the data generated by each application in a data repository 30 and updating 54 any of the data having the key parameter field when one of the applications is used to modify any of the stored data having the key parameter field. The method additionally includes serving 56 the updated data to any of the other applications when one of the other applications retrieves data having the key parameter field from storage. As illustrated in FIG. 8B, additionally, this method may further comprise applying 51 at least one business process model to data including at least some of the stored data having the key parameter field, and updating 52a business model data when any of the stored data are updated by operation of any one of the applications.

Serving 50 a plurality of applications to respective users may include facilitating user access to a plurality of applications, such as by providing access to application software or software which can be used to interface with one or more applications. Serving 50 a plurality of applications may also include providing access to hardware which can be used to access one or more software applications. Serving 50 a plurality of applications may also include providing a user network, such as a local-area network, wide-area network, access to a global network, or other type of network wherein one or more users can access one or more applications through the network. Serving 50 a plurality of applications may also include providing an applications server which presents web pages to respective Internet connected users.

In accordance with the above aspects of the invention, data transfer or information flow between users is facilitated by providing a system which takes data generated by one application and provides it as input into one or more of the other applications. The system may also include a notification feature which can be used to notify users when newly generated information is available for their access and use. Advantageously, this type of information transfer allows data to be transferred substantially instantaneously, eliminating the need for generating data reports, arranging meetings to facilitate data transfer, or relying on other data transfer methods which are highly susceptible to human error and dependent upon human intervention. Further, facilitating the transfer of data between applications ensures that accurate and current data is available for running other applications, such as business analysis applications, for generating monthly reports, and for making major business decisions. Further, providing for the communication of related data between user applications eliminates the potential for errors resulting from manual data re-entry, since the information needs only to be keyed in once for distribution to other applications and through the organization. This type of information management system also eliminates confusion regarding project status and data locations when users originally responsible for such projects leave an organization or cannot be reached for an extended period of time.

To further illustrate aspects of the invention, an example of the invention used to manage information for a hydrocarbon-producing portfolio is discussed in detail below.

Managing Information for a Hydrocarbon Producing & Opportunities Portfolio

In one example, the hydrocarbon-producing portfolio comprises existing and prospective hydrocarbon-producing wells and properties. The prospective wells include both current prospects (ones having approved drilling locations) as well as potential prospects. The information to be managed includes portfolio relevant data and related work product (generally referred to as data) for each of the wells and properties of the hydrocarbon-producing portfolio, as well as other information (cost tables, economic indicators, etc.) relevant to defining, developing, and managing the portfolio. Portfolio relevant data may include, for example, any data relevant to the development of assets in the portfolio, such as existing and proposed well locations, corresponding lease obligations, capital equipment at well locations, and estimated hydrocarbon reserves in reservoirs penetrated by existing and prospective wells.

As noted in the Background section, the functions related to defining, developing, and managing a hydrocarbon-producing portfolio are distributed among various individuals in an organization. These individuals can be segregated based on job function, into functional groups, or based on the assets being developed, into asset development teams. Each asset development team typically comprises an individual from each of the functional groups required to define, develop, and manage the asset of concern in the portfolio. Thus, the terms asset team members or functional groups may be loosely and interchangeably used to refer to individual users in the organization which generate portfolio relevant data, typically as part of their assigned job function.

Figure 10:
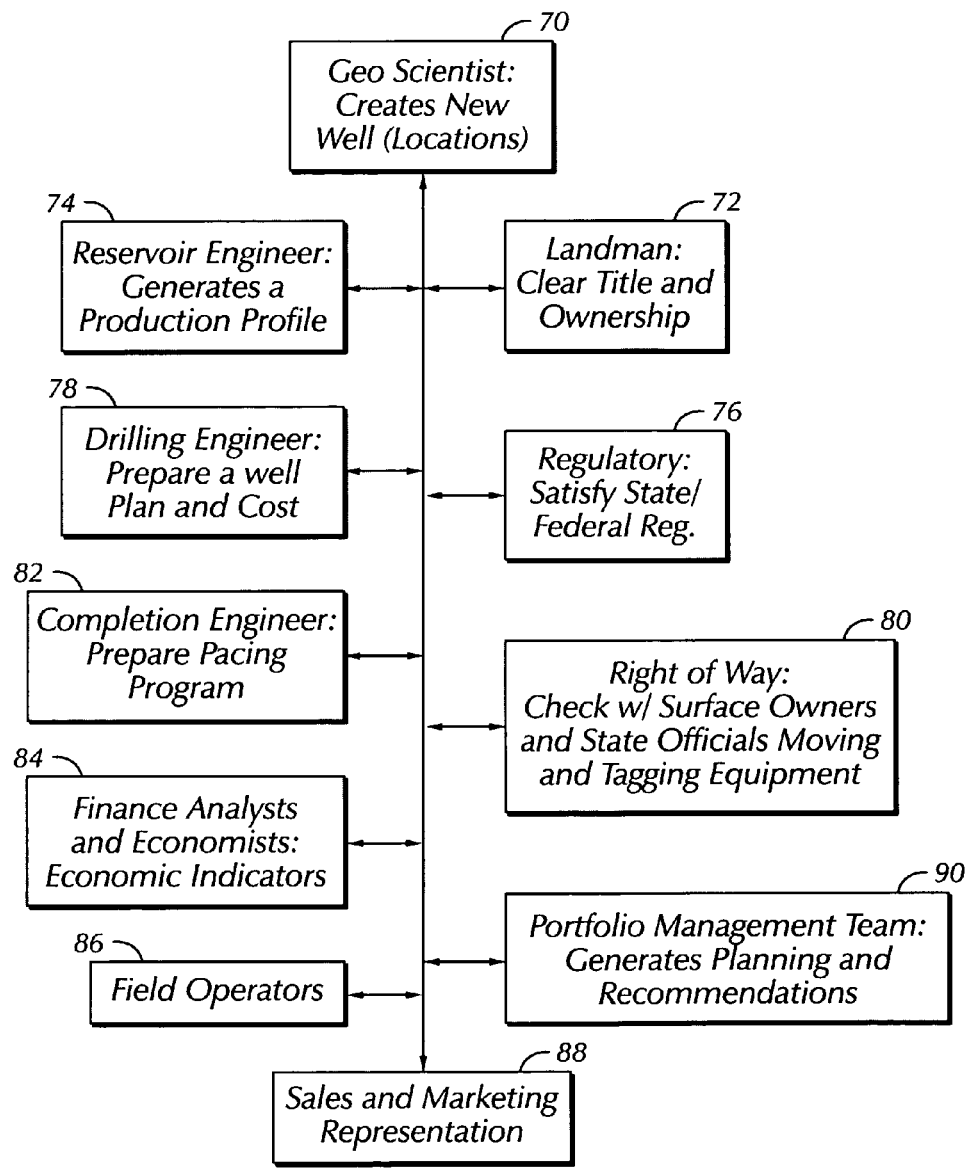
FIG. 10 shows one example of simplified business flow between members of a hydrocarbon development asset team.

As illustrated in FIG. 10, in this example, the functional groups in the organization which generate portfolio relevant data include Geoscientists 70, such as Geologists or Geophysicists, Landmen 72, Reservoir Engineers 74, Regulatory Compliance Administrators 76, Drilling Engineers 78, Right-of-Way Administrators 80, Completion Engineers 82, Finance Analysts 84, Field Operators 86, Sales and Marketing Representatives 88, and Managers 90. The functional groups may also include Production Engineers, Facility Engineers, Material and Logistics Specialists, and other professionals, not shown in FIG. 10. In this example, these functional groups, for the most part, are the users of the information management system. However, it should be understood that the invention is not limited to these users.

In the process of developing and/or managing assets (wells/properties) in a hydrocarbon-producing portfolio, typically each of the functional groups is required to generate particular data relevant to their function and related to the function of other groups. This related data must be communicated to the other function groups on the asset team (or the other asset team members) whose functions are dependent upon such data. Since the functions of members on an asset development team for a hydrocarbon-producing portfolio are, generally, standard industry wide, a variety of software applications have been developed for, and are typically used by, each of the respective functional groups to assist in the collection, generation, and/or analysis of data particular to their respective function. Because these software applications, for the most part, are function specific, they do not facilitate global sharing and communication of data between the various groups which make up the asset development team. Examples of commercially available software applications for each functional group and the type of data generated by each group are provided below.

Examples of an application which may be used by a Geoscientist 70 to generate and store geoscience related data are applications sold under the trademark "Open Journal" and "Open Works" by Landmark Graphics Corporation of Houston, Tex. Data generated by a Geoscientist 70 may include, for example, screenshots of 3-D seismic surveys, well log types and curves, and other well characterization data such as the net effective pay, porosity, and water saturation (fractional volume of reservoir pore space filled with water) of the reservoir penetrated by various wellbores, and coordinates of prospective wells.

One example of an application which may be used by a Landman 72 to organize and store land related data is a petroleum land management application, such as the one sold under the trademark IWS LAND by IHS Engineering of Englewood, Colo. Data generated by a Landman 72 may include, for example, a lease initiation date, lease expiration date, royalty, gross or working interest, net revenue interest, and lease obligations for a given well or surface property.

Examples of applications which may be used by a Reservoir Engineer 74 to generate and store data include applications sold under the trademarks PEEP DECLINE and WELL LOG by Merak Projects, Inc, of Houston, Tex. Data generated by a Reservoir Engineer 74 may include, for example, reservoir historical data such as production versus time data for a given well, or wells in similar formations or for other wells in the same formation.

One example of an application which may be used by a Regulatory Compliance Administrator 76 to store relevant data is a spreadsheet application, such as one sold under the trademark MICROSOFT EXCEL by Microsoft Corporation of Redmond, Wash. Data of relevance to a Regulatory Compliance Administrator 76 may include, for example, field names, regulatory field names, and zones penetrated by a given well. Regulatory data may also include any information related to which well is to be completed, what zone or reservoir was completed, well test results, and other data required for submission, typically on special forms, to government agencies charged with regulating petroleum production. Examples of such forms include "G-1" and "G-10" forms required by the Railroad Commission of Texas. Currently electronic filing systems are being set up by various regulatory commissions, such as the Railroad Commission of Texas, so that these forms can be accessed, filled out, and submitted over the Internet.

Examples of applications which may be used by a Drilling Engineer 78 to generate and store data related to drilling include applications sold under the trademarks DIMS by Landmark and WELL LOG by Merak. Data generated by a Drilling Engineer 78 may include, for example, data related to drilling and well specifications (e.g., bit and casing size, depth, etc.) and data related to equipment required to build a drilling location and drill the well (e.g., pipe sizes, pipe lengths, pipe quantities; types and quantities of cement, gravel, and boards; contract services, capital equipment). Data generated by the Drilling Engineer 78 may also include cost tracking information, and rig scheduling (time and place allocation of capital equipment).

Examples of applications which may be used by a Finance Analyst 84 to generate and store data include applications sold under the trademarks PEEP by Merak, and ARIES by Landmark. Data generated by a Finance Analyst 84 may include, for example, any economics data, such as the working interest payable on a property or the royalty obligations owed to a lessor on a particular property, and any partner operations data. To calculate this economic data requires data related to well production on selected properties, lease terms, etc.

Examples of applications that may be used by a Field Operator 86 to generate and store relevant data include applications sold under the trademarks DIMS by Landmark and WELL VIEW by Merak. Additionally, relevant field operation data, such as production and pressure data, may be captured in real time using a measurement and control system, such as a SCADA system (supervisory control and data acquisition system) which captures production data in real time. Data generated or provided by a Field Operator 86 may include, for example, production levels, tank levels, well pressures, flow rates, perforation dates, etc. Once generated, this production information may be provided to Geoscientist and Reservoir Engineer applications for updating geological and production prediction models so that future predictions will be based on the most current information available. Also, perforation dates may be provided to Landmen, for example, for comparison with lease dates and terms.

Applications which may be used by Sales and Marketing Representatives 88 to generate data include production forecast applications such as forecasting software sold by Merak and Schlumberger Geoquest. Data generated by Sales and Marketing Representatives 88 include, for example, production forecast data used to determine future market value and sales volumes for marketing and selling expected hydrocarbons. To provide accurate forecasts, Sales and Marketing Representatives require up to date information related to production of currently producing wells, expected production from wells currently being drilled and expected to be drilled.

Examples of applications which may be used by a Portfolio Manager 90 include one sold under the trademark Merak Capital Planning by Merak. Data generated by a Portfolio Manager 90 may include, for example, optimized resource allocation schedules and reports, portfolio inventory reports and figures, and economic forecast summaries. Generation of accurate data by a Portfolio Manager 90 requires update information on essentially every facet of the portfolio assets being considered, thus data from each of the functional groups on the asset teams.

Figure 11:
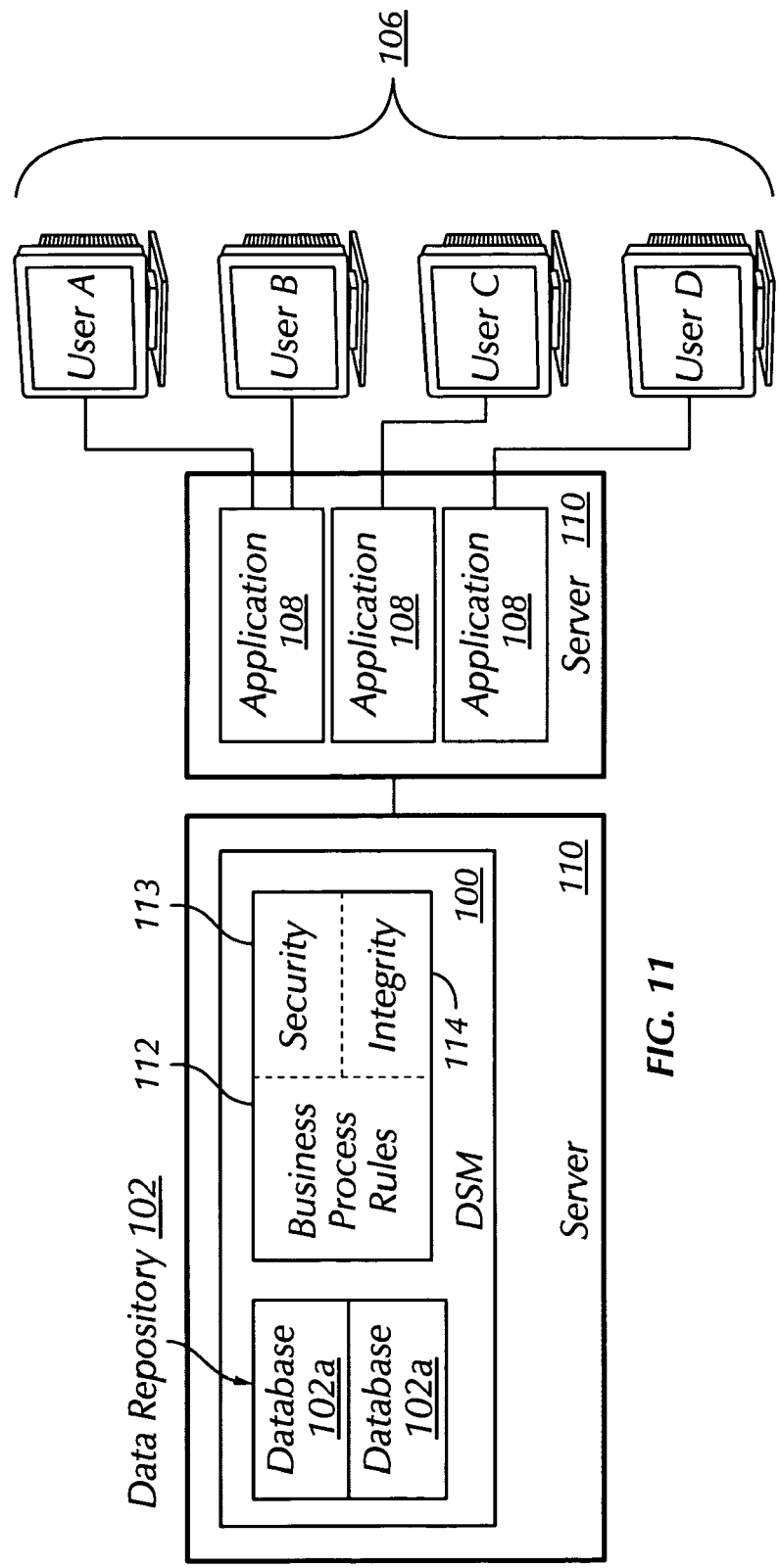
FIGS. 11 and 11A are illustrations of embodiments of an information management system used to manage information for a hydrocarbon-producing portfolio.

To streamline the management of information for the hydrocarbon-producing portfolio, data generated by each of the functional groups needs to be captured, organized, and communicated between the functional groups involved in the defining, development, and management of the portfolio. Referring to FIG. 11, in this example, capturing, organizing, and communicating data between the functional groups is facilitated by serving applications 108 to respective users 106 and storing related data generated by the respective users 106 in a commonly accessible data repository 102.

Figure 11A:
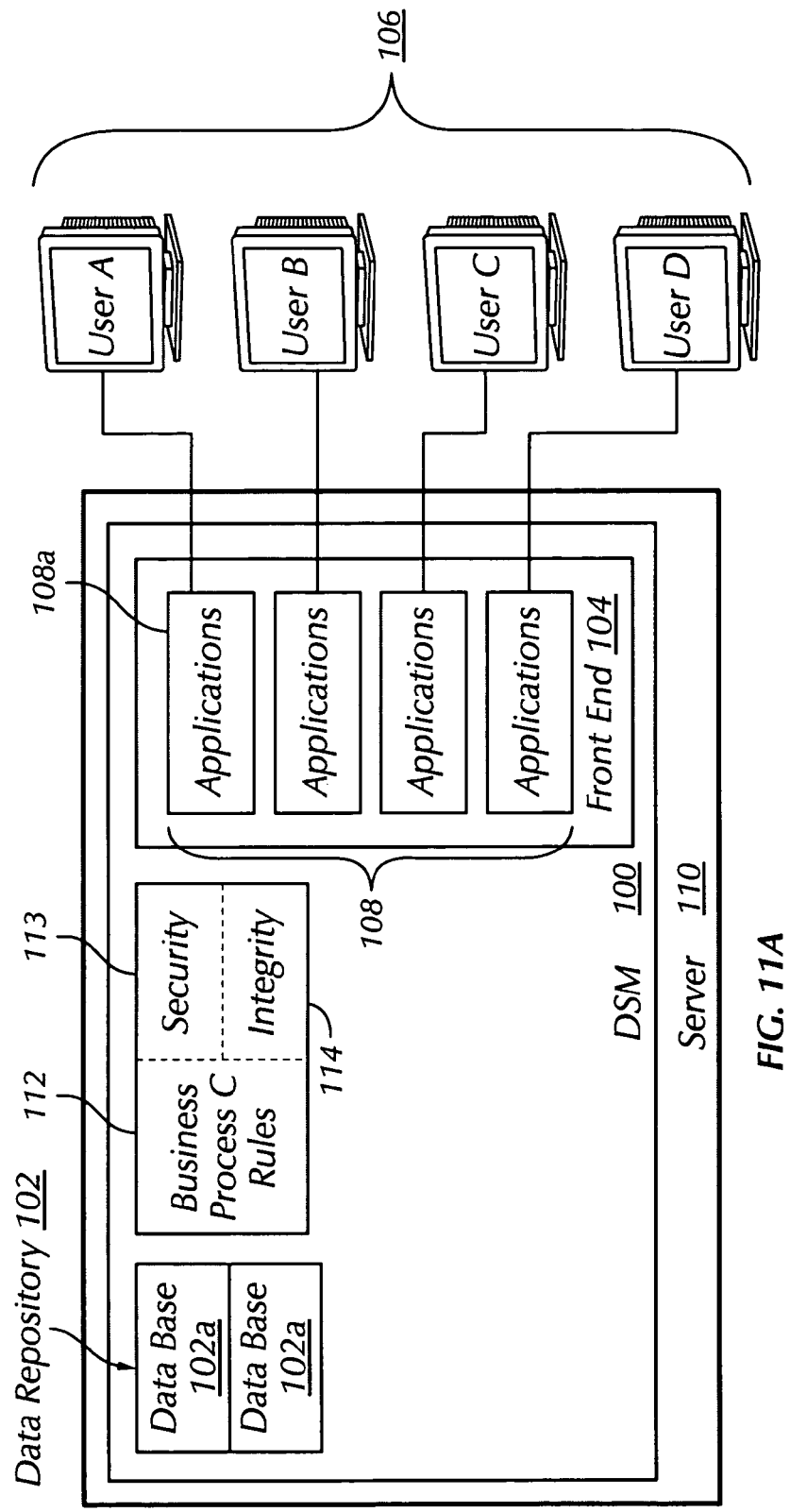

The applications 108 may comprise separate or distinct applications directed to separate functional groups for generating or entering data relevant to the function of that functional group, such as the function specific applications described above. Referring to FIG. 11A, alternatively the applications 108 may comprise a plurality of application modules 108a embedded in one or more parent applications (such as 104), wherein each module 108a is direct to one or more particular functional groups for generating or entering data relevant to the portfolio.

The data generated by each application 108 is, preferably, stored in a common or commonly accessible data repository (or data warehouse) 102 which may comprise a single database or a plurality of databases on a common server 110 or accessible through a system network. When any of the applications 108 is used to modify related data linked to a key parameter field, data linked to that key parameter field will be updated in the data repository 102. Additionally, related data residing in databases outside of the data repository and linked to the key parameter field may also be updated. When data having the key parameter field is updated in the data repository 102, the updated data is served to any of the other applications 108 when those applications 108 retrieve data from the data repository 102 having the key parameter field.

Data Storage Manager

In this example, a database management system is developed to capture and organize data in the data repository 102, and to communicate data to the various applications 108 in the system. Database management systems, in general, typically comprise a suite of programs which manage large structured data sets. In this example, the database management system controls the organization, storage, and retrieval of data (i.e., fields, records, and files) in the data repository 102 and also includes means for data security and integrity. The database management system also incorporates business process rules 112 to govern the generation and flow of information such that it models the information flow of the organization. Referring to FIG. 11, in this example, the database management system including the data repository 102 are collectively referred to as the Data Storage Manager (DSM) 100.

The DSM 100 comprises an Oracle database 102a system with an Access front-end 104. The DSM 100 provides a fully integrated data repository 102 for capturing and organizing data and other information related to the hydrocarbon-producing portfolio. In this example, the system includes a network having one or more servers 110 which connect various users 106 to the DSM 100. This system allows the DSM 100 to be accessed by a plurality of users 106 in a plurality of different locations. Connection to the DSM 100 may be implemented in any way known in the art, such as via Internet or intranet connections, LANs, WANs, or through similar technology. As a common data repository 102, substantially all essential information relevant to defining, developing, and managing assets in the hydrocarbon-producing portfolio is stored onto the DSM 100 by the plurality of users 106, or made accessible to or through DSM 100.

Those skilled in the art will appreciate that data in the data repository 102 is structured or organized in terms of fields (individual items of information), records (a complete set of related fields), and files (sets of records). For example, a record in the data repository 102 may comprise all data in the repository 102 related to an individual asset (well or prospective property) in the portfolio. Those skilled in the art will also appreciate that data in the data repository 102 relating to a particular asset can be linked or tied to a key parameter field and various fields and/or records may be tagged for use by the various applications based on the key parameter field. For example, unique American Petroleum Institute (API) well codes (assigned to all wells in the U.S.) may be used as the key parameter field for each record to link related data generated by different applications 108 or stored in other related systems. In the case of prospect wells or properties that have not been assigned an API well code, a unique project identification number or code can be assigned and used as the key parameter field used to tag or link data related to a particular prospect. Once an API well code is assigned, these project identification codes can be linked to or replaced by the assigned API well code if desired.

In this example, each record for a given asset in DSM 100 may comprise thousands of fields of data; thus the fields associated with each record will not be listed here. However, in general, for a hydrocarbon-producing portfolio, the DSM 100 will typically include specific data components, such as Land 100a, Regulatory 100b, Geology 100c, Reservoir 100d, Facilities 100e, Rig Scheduling 100f, Financial 100g, and Automatic Notification 100f, as illustrated for example in FIG. 16. Although the specific fields provided for each data record are not presented here, those skilled in the art will appreciate that such data fields can be determined through assessment and analysis of the business structure, information generation, and information flow for a particular organization of interest.

Referring to FIG. 11A, business process rules 112 are embedded in the DSM 100. In some cases, application of particular business process rules 112 may dictate that data in certain data components cannot be entered until data in one or more preceding data components has been provided. For example, referring to FIG. 16, Rig Scheduling data 100f for a given well may not be entered until Geology 100c and Reservoir 100d data, such as the x-y coordinates for the well location and expected well characteristics, have been entered and the well has been approved for drilling. Also, in some cases, data input in one component may result in an action (such as an automatic notification 100h) or automatic generation of data in another component. For example, input of equipment cost tables and a drilling equipment list for a particular well design may result in the automatic calculation of the estimated drilling cost data. Advantageously, such automatic calculations can be embedded in the system to insure uniformity between calculation methods used throughout the organization.

Figure 12:
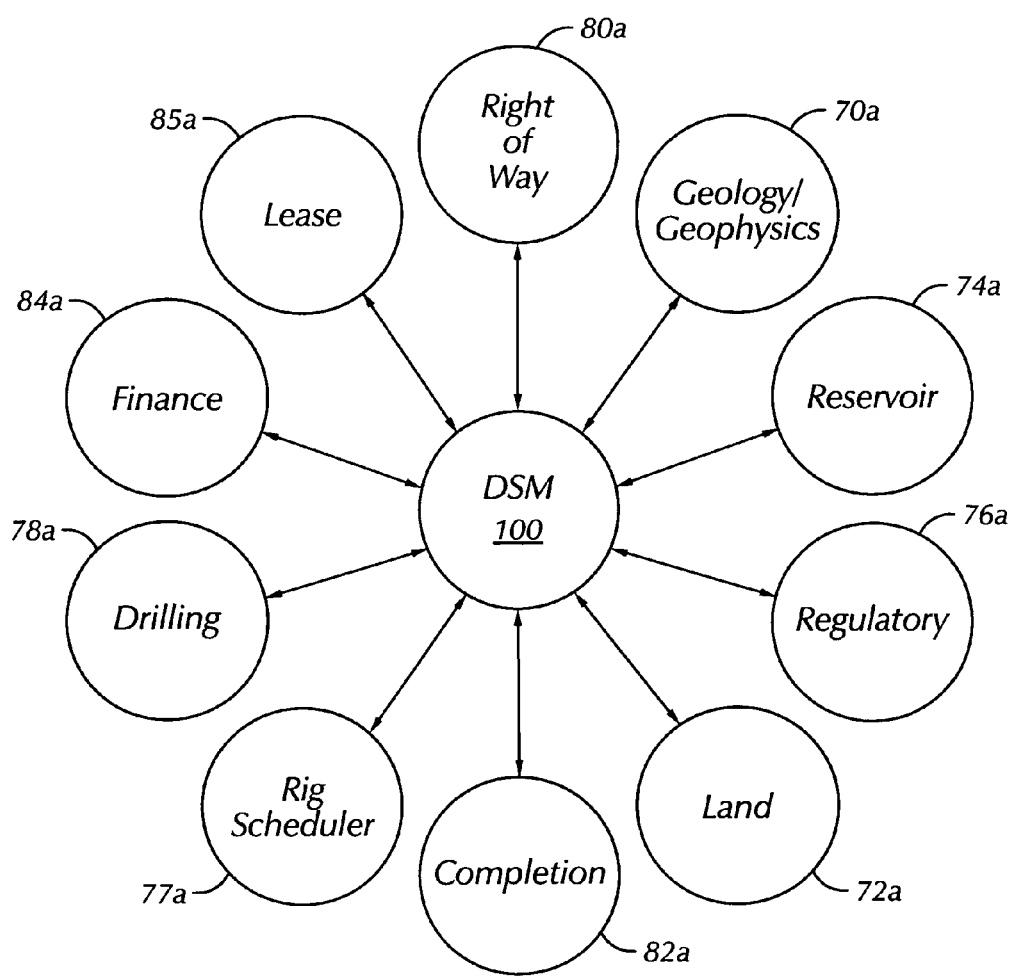
FIG. 12 is an illustration of one embodiment of a high-level view of a data storage manager structure (DSM), illustrating the types of data that may be provided to the DSM.

As illustrated in FIG. 11A, in this example, the DSM 100 comprises a front-end user interface 104 segregated into a plurality of application modules 108A directed to specific users. This front-end interface 104 allows particular users 106 to use applications they would normally use to analyze asset characteristics and generate data and then transfer or enter their resulting relevant data directly into their respective DSM application module 108A. Examples of general types of relevant data that may be provided to DSM 100 by the various users 106 are shown, for example, in FIG. 12. This data includes geology/geophysics data 70a, reservoir data 74a, regulatory data 76a, land data 72a, completion data 82a, rig schedule data 77a, drilling data 78a, finance data 84a, lease data 85a, and right-of-way data 80a.

Referring back to FIG. 11, the DSM 100 is also designed so that work product generated by users 106 and relied upon to obtain relevant data, such as graphics, analysis notes, spreadsheets, can be captured in DSM 100 and stored as related data in the data repository 102 for review or reference by other users 106. For example, if a Geologist relies on seismic curves or other data generated using Open Works or Open Journal to obtain a well location, the Geologist can capture an image of the file, and then through DSM 100 access and view the captured file and, if desired, store the file using DSM 100 in the data repository 102. This capability allows DSM 100 not only to capture basic portfolio data, but also to capture work product illustrating the reasoning process behind how the data were obtained.

Figure 13:
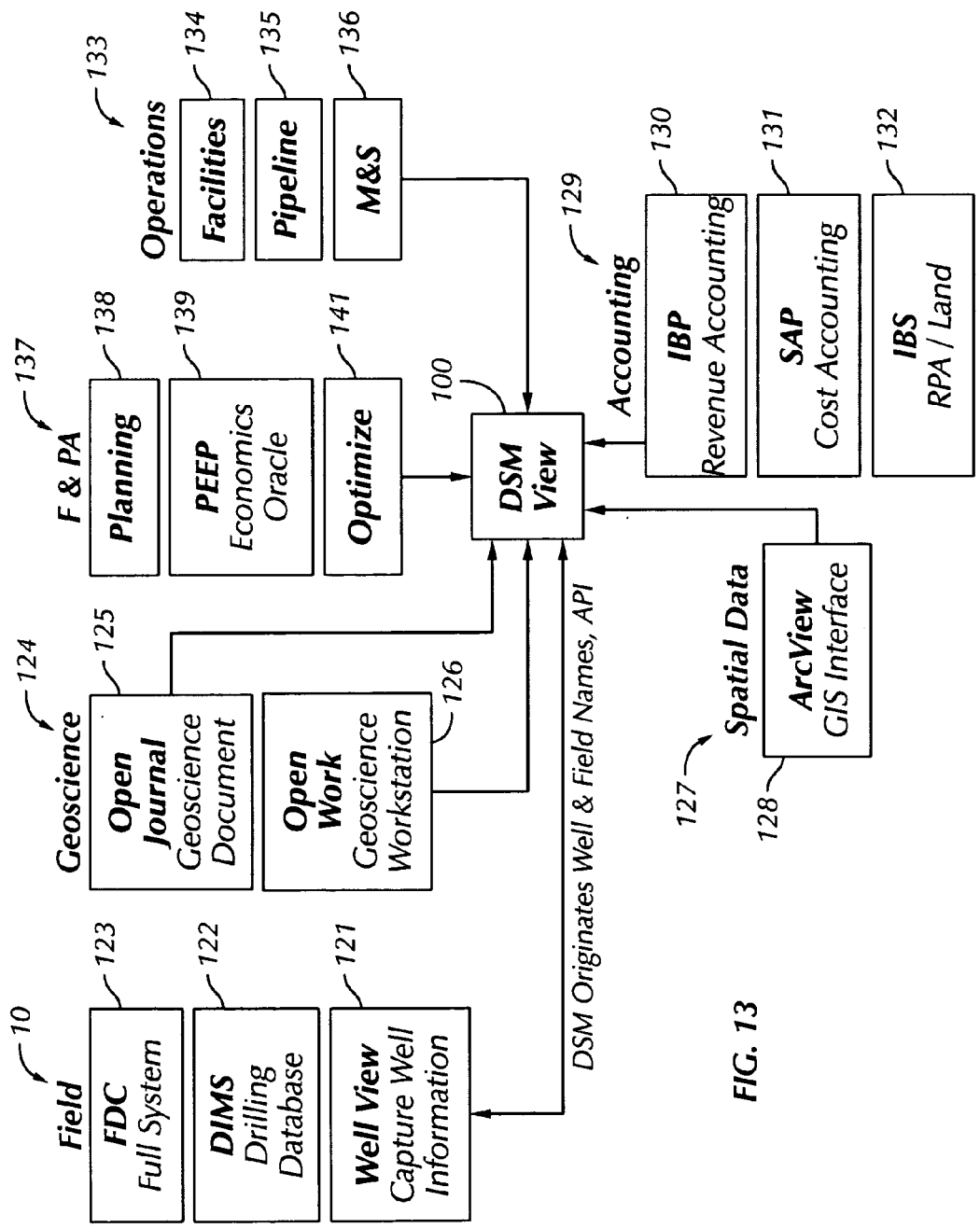
FIG. 13 is an illustration of key links which may be provided to and from the data storage manager for one embodiment of the invention.

Examples of key links between DSM 100 and other software applications or systems outside of the DSM 100 system in this example which permit users 106 to either view, capture, or links to common data generated by the applications and systems are illustrated in FIG. 13. For example, DSM 100 can link to or be linked from field related information systems 120, such as an application sold under the trademark Well View by Merak 121 which is used to capture well design and operation information, an application sold under the trademark DIMS by Landmark Graphics, Corp. 122 which is used to capture drilling and well services information, and a field data capture (FDC) system 123 which is used to capture production data. DSM 100 also can link to geoscience applications 124, such as to the previously mentioned applications sold under the trademarks Open Journal 125 and Open Works 126 by Landmark Graphics, Corp which are used to generate geoscience documents and workstation data. DSM 100 also can link to or be linked from spatial data applications 127, such as the desktop mapping and geographic information system (GIS) sold under the trademark ArcView 128 by Environmental Systems Research Institute (ESRI) of Redlands, Calif. Arc View 128, for example, can be used to map and analyze spatial and relational data stored in DSM 100, such as well locations.

DSM 100 also can link to or be linked from operations systems 133, such as to and from facilities 134, pipelines 135, and marketing and sales 136. DSM 100 also can link to or be linked from accounting systems 129, such as the revenue accounting system sold under the trademark IBP 130, the cost accounting system sold under the trademark SAP 131 by SAP of Walldorf, Germany, and the land accounting system sold under the trademark IBS 132. Additionally, DSM also can link to or be linked from financial and planning analysis systems 137, such as planning tools 138, economics applications such as the one sold under the trademark PEEP by Merak 139, and optimization applications 141, such as ones sold by Merak, Schlumberger Geoquest, and Landmark Graphics.

Referring to FIG. 11A, data security 113 and integrity 114 for DSM 100 are maintained through read/write privileges which are embedded in the system to prevent unauthorized users from viewing or altering data in the data repository 102. For example, user profile information (username, password, function/title, etc.) is required to access data in the data repository 102, and write privileges are granted by function. For example, only a user 106 classified as a Supervisor may enter data indicating that a project has been approved, and only a user 106 classified as a Drilling Engineer may alter any well design data. These restrictions are only an example of business processes rules 112 of an organization which can be embedded into DSM 100.

The integrity 114 of the data in DSM 100 is maintained by only allowing one user 106 to update data at the same time. For example, if a user 106 wishes to modify information in a particular record, the user may "capture" that record or an aspect of that record, for example, by clicking on an "edit" button in the user's DSM application 108. Once the data is captured, the user 106 may make changes to the record as governed by the embedded business process rules 112. The user can then store the updated data in the data repository 102 of DSM 100, for example, by clicking on a "save" button in the application 108.

Additionally, the DSM 100 prevents users 106 from storing duplicate records in the data repository 102. For example, the DSM 100 will not store a new well record having the same API number (unique key parameter field) as a current well record in the data repository 102. Additionally data integrity 114 may be insured by applying standardized business formulas to automatically calculate data values based on values for related data. For example, an estimated drilling cost for each project may be automatically calculated based on a list of drilling equipment needed, a standardized equipment costs list (maintained by cost analysts), and a standardized miscellaneous cost factor of +5% of calculated costs to obtain the estimated drilling costs.

As previously noted, serving the DSM 100 through an applications server connected to a network allows the DSM 100 to be dynamically updated and accessible to a plurality of users 106 in various locations. For example, local computers may access DSM 100 through intranet or LAN systems. Remote computers, such as those in the field or other remote offices, may dial-in to the DSM 100 using modems or similar remote access technology or connect via WANs to update and view information. Alternatively, access to DSM 100 may be provided through the Internet, wherein a web server operatively couples to the DSM 100.

Providing an information and knowledge management system that permits asset team members to readily access portfolio relevant data generated by other members may result in increased accountability between members of the asset team. For example, with this type of system it becomes readily apparent who may be holding up progress in the development of a particular asset by not providing timely or accurate data to the system. With this type of system, supervisors or managers can access the data repository to determine which subordinates have not timely completed functions or entered their corresponding data.

Further, storing portfolio relevant data generated by the individuals responsible for such data as part of their work routine in DSM 100, provides an element of data integrity and an increased efficiency in the development and management of the portfolio. Additionally, this type of information and knowledge management system provides the ability to model various portfolio scenarios (to be further described) without the difficulty of data collection, since substantially all of the relevant data is stored or readily accessible through a system such as DSM 100.

Use of DSM by Functional Groups

An example of how the DSM 100 may be used by the various members of an asset team will now be discussed.

Referring to FIG. 10, to initiate development of a property a Geoscientist 70 is first relied upon to predict whether or not oil/gas accumulations exist in the field. To perform this function, screen shots of seismic curves, log types and curves, well characteristics, etc. may be generated and interpreted by the Geoscientist 70 in his determination of where hydrocarbons are likely to exist in the given area. Based on his interpreted data, the Geoscientists 70 determines x,y coordinates for well drilling locations where he believes the best chance for finding oil/gas will be. Once the Geoscientist 70 determines the x,y (map) coordinates for prospective drilling locations this information is stored in the data repository and can be accessed by other functional groups who require this information. Additionally, once the Geoscientist 70 has provided the map coordinates to the data repository by generating a location in his application, automatic notifications can be sent to specified functional groups who have need of the map locations, such as Landmen 72, who would check lease obligations and status against the proposed locations.

Once map coordinates are provided to the system, for example, the data commonly used by a Reservoir Engineer's 74 application (such as map locations) are automatically updated to reflect the location for a new drilling prospect. This allows the Reservoir Engineer 74 to immediately check the locations against reservoir maps and begin his assessment of what is likely to result in terms of production based on prospect location information provided by the Geoscientist 70. Similarly, data used by the Landman's 72 application is automatically updated with the new location which allows the Landman 72 to immediately check the location against lease obligations and begin any necessary lease activity required to clear the location for drilling. The data used by the Drilling Engineer's 78 application is also automatically updated, which permits the Drilling Engineer 78 to immediately check the prospective location against current rig locations, locations of site building equipment and, if necessary, generate new rig schedules based on the updated information. The data used by the Finance Analyst's 84 application is also automatically updated to reflect the new data provided by the Reservoir Engineer 74 and Drilling Engineer 78, which permits the Finance Analyst 84 to apply business process models, such as to plot well schedules into a production forecasting tool such as "ProCast" (described below) and generate cash flow forecasts based on the newly updated prospect information. The data used by the Sales and Marketing Representatives' 88 application may also be automatically updated based on the most recently generated production forecast, which permits the Sales and Marketing Representatives 88 to immediately account for the change in the portfolio data in plots of ProCast against product price forecasts.

Based on the x,y coordinates and analysis of related information (e.g., production vs. time for similar formations, or wells drilled in same formation) the Reservoir Engineer's 74 function is to predict production resulting from drilling a well at the coordinates provided by the Geoscientist 70. Data related to the Reservoir Engineer's 74 prediction is then updated in the data tagged to the Reservoir Engineer's 74 application, and the updated data may then be used to automatically update corresponding data in other applications, such as the Finance Analyst's 84 application. Additionally, the system may be programmed to provide an automatic notification to other functional groups that the updated reservoir data are now available. For example, predicted production data may be automatically "tagged" to the Drilling Engineer's 78 application to permit Drilling Engineer to begin work on designing drilling specifications for drilling at the particular location to obtain the predicted production. This predicted production data may also be tagged to be used by a management application to allow a Manager 90 to determine whether or not current or future resources should be allocated to drill the particular location, or whether or not a particular property (undeveloped leases and/or producing wells) should be held in the portfolio or sold. The predicted production may also be used to automatically update the Finance Analyst's 84 application so that the expected new production can be taken into account in economic forecasts performed by the Finance Analyst 84.

Using data provided by the Geoscientist's 70 application to the Landman's 72 application, the Landman 72 is able to immediately begin work on securing lease agreements if necessary for drilling, or can evaluate current lease agreements which are already in place. Once a lease on the desired property is secured, the Landman 72 may input and store pertinent lease information, such as primary lease dates, secondary lease dates, and lease obligations. Other aspects of the Landman's 72 application may affect data relating to the prospect locations. For example, if a particular location is outside of a permissible position on a particular lease, the Landman's 72 application can adjust the location to comport with lease requirements, surface hazards, and/or regulatory requirements. The Geoscientist 70 and Reservoir Engineer 74 can be automatically notified of the proposed change in the location and can either accept the new location or indicate that the prospect should not be drilled as altered by the Landman 72.

Drilling Engineers 78 may use cost of materials data and well construction cost data provided by Field Operators 86 and materials management personnel in the organization to generate accurate cost estimates for drilling particular prospective well locations. These estimated cost data can also be used by the Financial Analysts 84 to generate financial performance predictions based thereon. As drilling cost estimates change based on real drilling cost experience, reported changes in materials costs, or changes in the costs of building locations, for example, the cost data when so updated by the Drilling Engineer 78 in designing wellbores can also be used by the financial analysts to update financial performance of the prospective locations in the portfolio.

Regulatory Administrators 76 may access data such as the locations and target reservoirs of proposed wells to populate drilling permit applications for filing with the appropriate government agencies. Similarly, production test data generated by the Reservoir Engineer 74 may be tagged for use by the Regulatory Administrators 76 for populating well production test forms to be reported to the appropriate government agencies.

The above description is only an example of how a DSM 100 may be used as part of a data management system to collect and communicate portfolio relevant data, generate business process modeled data, and to model information process flow for a hydrocarbon-producing portfolio. A similar information management system may be developed for managing other types of information based on an analysis of an organization's business and information process flow and associated business process rules. In view of the above description, other embodiments of the invention will be apparent to those skilled in the art.

Production Forecast Application

Figure 14:
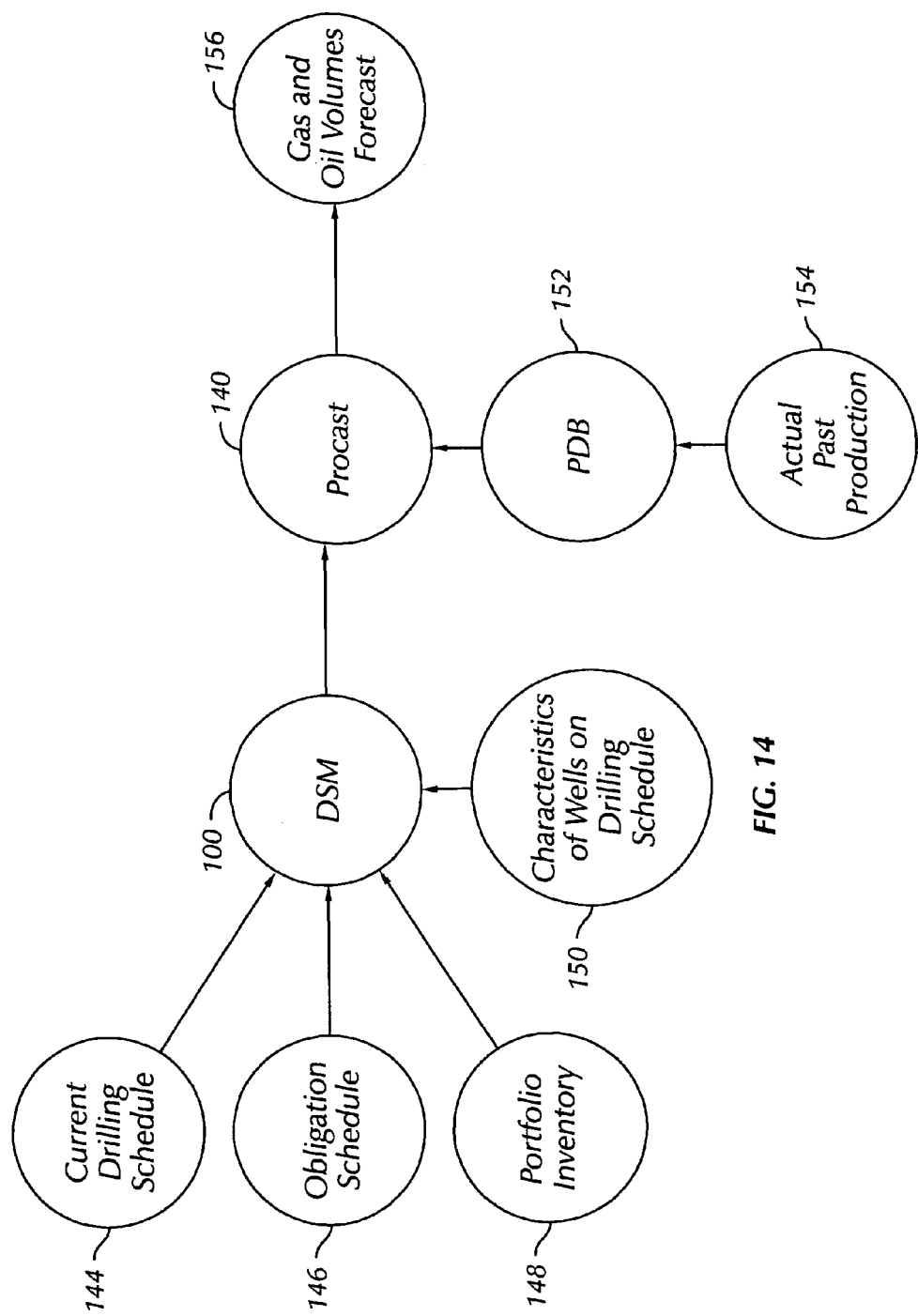
FIG. 14 illustrates the link and data flow between the ProCast system and the data storage manager for one embodiment of the invention.

Referring to FIG. 14, another aspect of the system for managing information for a hydrocarbon-producing portfolio is a portfolio production forecasting tool which seamlessly links to a dynamically updated data repository. In one embodiment, the production forecasting tool comprises a production forecast application, referred to as "ProCast". ProCast generates gas/oil production forecasts for specified time periods, such as one month, two months, and for the next 24 months, including any predicted production decline.

As illustrated in FIG. 14, ProCast 140 links to the data repository of DSM 100 to obtain current drilling schedules 144, obligations schedules 146, portfolio inventory 148, and the characteristics of wells to be drilled 150. For example, ProCast 140 may obtain as inputs from DSM for each well its initial production, decline coefficients and rate level for each pressure stages, probability of success, number of days to drill, number of days to put on production, and start of drilling data. It can then utilize this data to calculate on a daily basis the expected production of each well. Since DSM 100 is continually updated with new information generated by various users in the system, such as Geoscientists, Reservoir Engineers, Landmen, production forecasts are assured to be based on up-to-date, substantially real-time information.

ProCast 140 may also be adapted to link to a production database (PDB) 152 to obtain current and historical production information on currently operating wells. Data in the PDB 152 is also continuously updated and, thus, also provides the most accurate up-to-date, substantially real-time view of production. By providing a forecasting tool such as ProCast 140 and seamlessly linking it to a continuously updated data repository, such as the DSM 100 and the PDB 152, creation of a forecast based on accurate and substantially real-time data can be assured.

Those skilled in the art will appreciate that ProCast 140 retrieves and links data from DSM 100 and PDB 152 based on key parameter fields. For example, each well is assigned a unique code which serves as a key parameter, and ProCast 140 accesses well records based on this key parameter field and extract data required from each record to forecast the corresponding production for that well.

Additionally, ProCast 140 can be used to forecast production resulting from various proposed drilling schedules provided to ProCast 140 as input. As a result, ProCast 140 can be used to satisfy an organizations requirement of delivering forecast gas/oil volumes that relate to various proposed scenarios generated using a resource allocation optimization tool as further discussed below.

It should be understood that some functionality similar to that provided by ProCast 140 as described above is also available in commercial software applications sold by Merak, Schlumberger Geoquest, and Landmark Graphics. Thus, such applications could alternatively be used as the production forecasting tool of choice to link to a dynamically updated data repository, such as the DSM 100 system described above.

Portfolio Optimization Application

Figure 15:
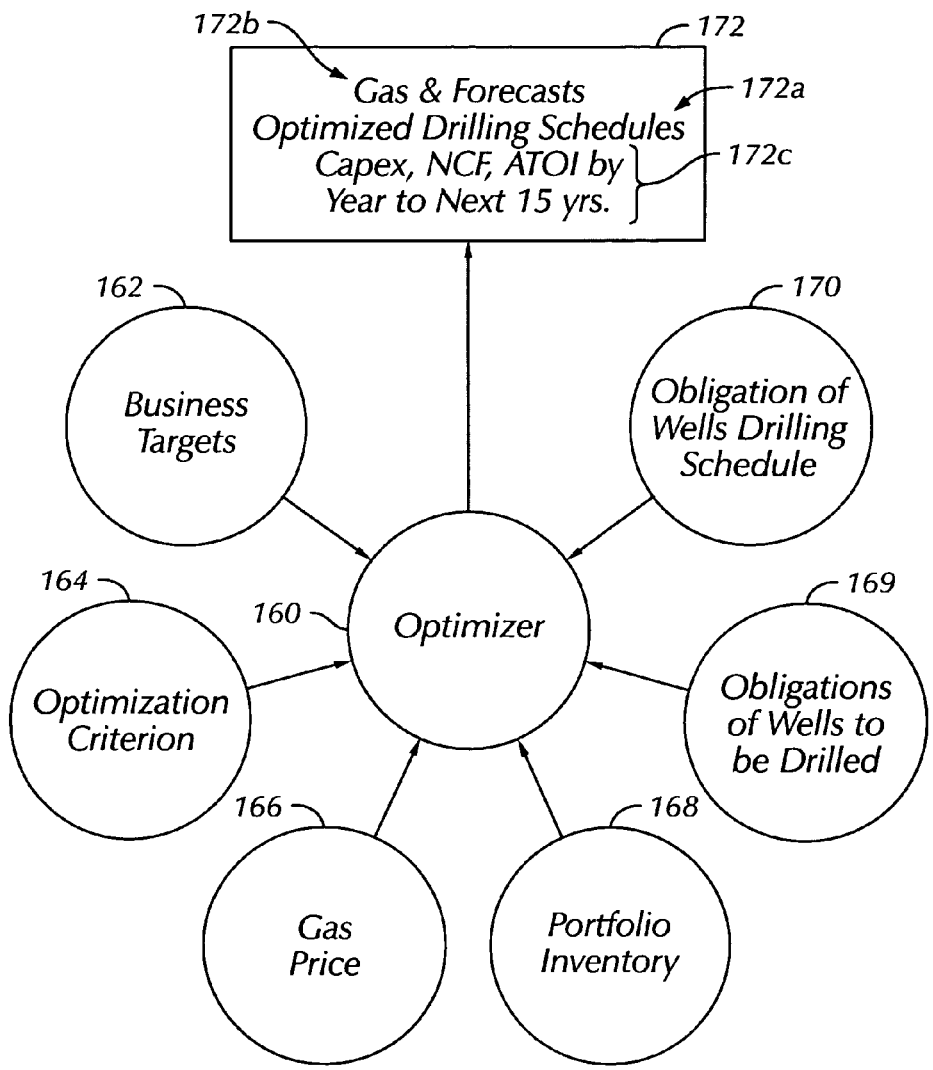
FIG. 15 is an illustration of the business flow for one embodiment of the Optimizer system.
Figure 16:
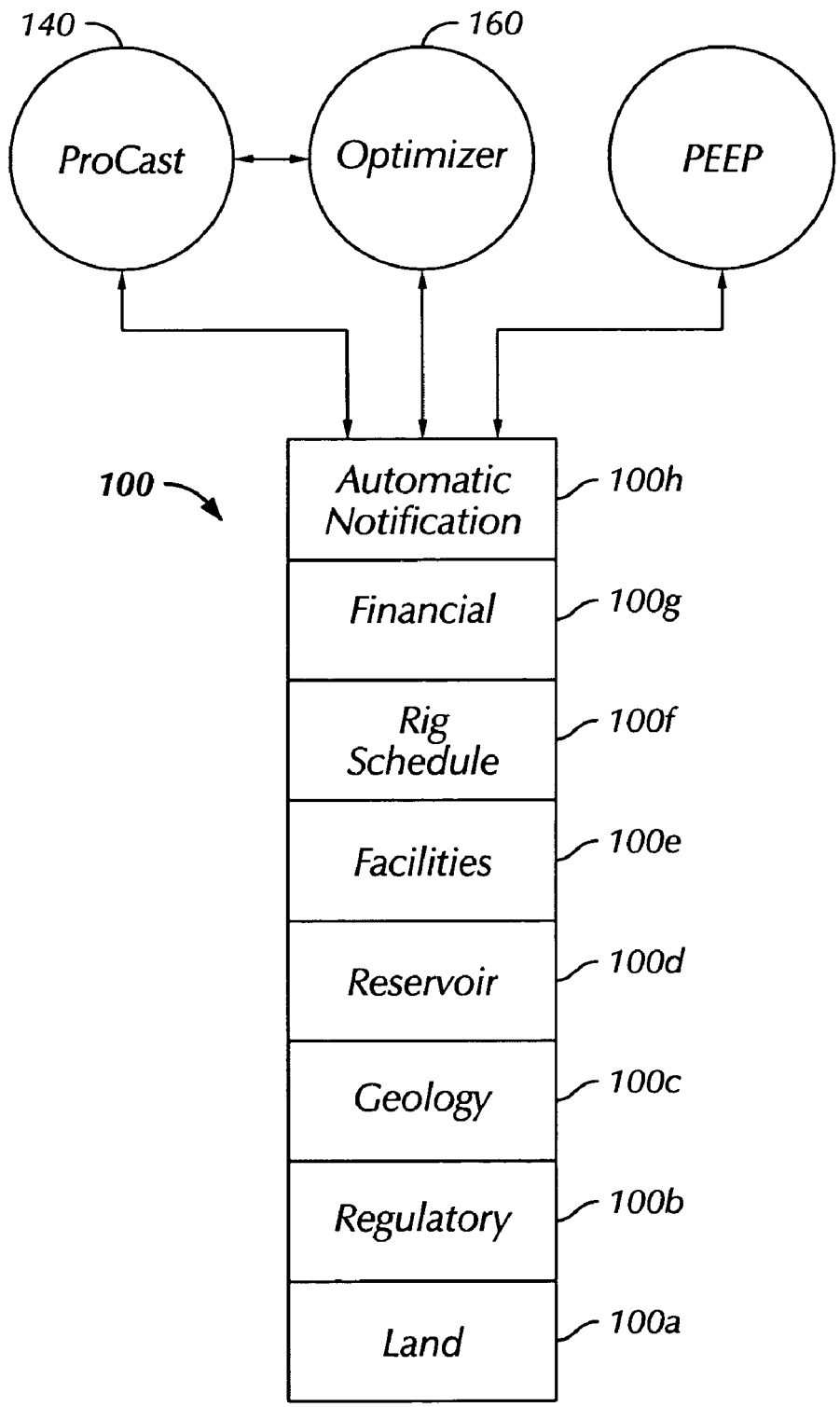
FIG. 16 is an illustration of one embodiment of the invention, wherein applications known as Optimizer and ProCast seamlessly linked to DSM manage and process information for a hydrocarbon-producing portfolio.
Figure 17:
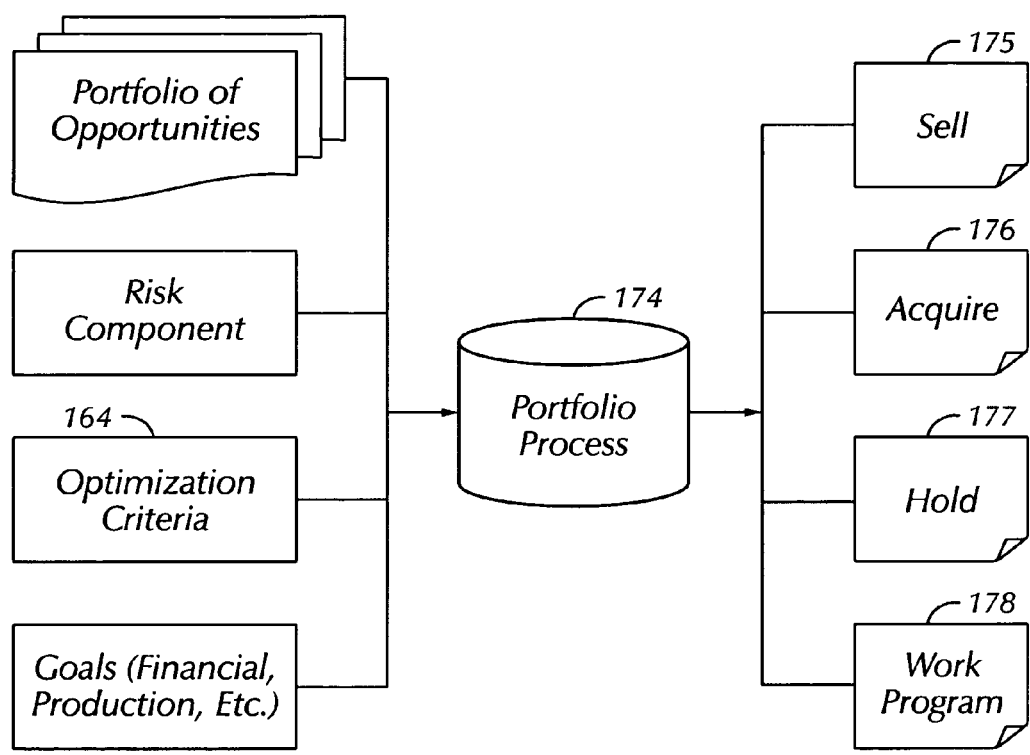
FIG. 17 is an illustration of one example of how the Optimizer can be used to streamline the portfolio management process.

Referring to FIGS. 15-17, another aspect of the system is a portfolio optimization tool which seamlessly links to a dynamically updated data repository. In one embodiment, the portfolio optimization tool comprises a portfolio optimization application, referred to as the "Optimizer" 160. The Optimizer 160 system in this example allows for the development of an operations-ready drilling schedule that can be optimized with respect to a selected financial performance or production performance criterion. The Optimizer 160 is built to seamlessly link to DSM 100, hence to the portfolio inventory and obligations schedule.

Referring to FIG. 15, one of the main functions of the Optimizer 160 is to optimize asset development opportunities based on the selected criteria 164 to achieve a given goal, target, or a set of goals. Selected criteria 164 used in Optimizer 160 to determine optimized drilling schedules 172a, for example, include: 1) drilling the most profitable or highest value wells first; 2) drilling the quickest pay-out wells or cheapest wells first; 3) achieving a set of net cash flows per year for the next 15 years; 4) achieving a set of earnings and a set of gas production volumes; 5) optimizing the drilling schedule given a set amount of capital dollars per year; and/or 6) drilling a certain number of wells per year. From a selected criterion, the Optimizer 160 may be used to generate a drilling schedule 172a, a corresponding gas/oil production forecast 172b (when used in conjunction with ProCast 140), and a series of net cash flows and capital expenditure dollars 172c by year and by field.

As illustrated in FIG. 15, the Optimizer 160 mimics business flow by taking into consideration business targets 162, optimization criterion 164, gas/oil prices 166, portfolio inventory 168, and obligation schedules 170 to determine an optimized allocation of resources 172. As illustrated in FIG. 16, the Optimizer 160 links to the DSM (100 in FIG. 16) and creates a drilling schedule 172a by utilizing data already captured in the data repository of DSM 100, such as the obligations schedule 170, portfolio inventory 168, and characteristics of wells to be drilled 169. Since the DSM 100 is continually updated with new information generated by various users in the system, such as Geoscientists, Reservoir Engineers and Landmen, creation of a current optimum drilling schedule 172a can always be assured.

Additionally, through the Optimizer 160, various development scenarios can be produced with different capital requirements, cash and earning profiles, and volume results over various time frames. As illustrated in FIG. 16, Optimizer 160 is able to then link to ProCast 440 to generate production forecasts corresponding to the various scenarios. This is done by using an optimized drilling schedule (172a in FIG. 17) generated using Optimizer 160 and providing it as the drilling schedule 172a entered into ProCast 140.

As illustrated in FIG. 17, the Optimizer 160 may also be used to process the portfolio 174 such as by ranking the various oil and gas fields that form the business based on selected criterion 164, to determine which assets to sell 175, acquire 176, hold 177, or further develop 178. In this way, the Optimizer 160 is able to provide several benefits to the decision making process of a business unit as well as streamline, organize, and implement clearly defined business rules into the portfolio management process.

Referring to FIGS. 16 and 17, an optimization application, such as the Optimizer 160, combined with the DSM 100 system can be used to streamline an organization's ability to make daily decisions and implement the work program 178. It can also be used to ensure project development is being optimally implemented, and to develop the capability to capture the work program 178 and expected production and monetary results in a nearly real-time manner.

It should be understood that functionality similar to that of the Optimizer 160 is also available in commercial software applications, such as those sold by Merak, Schlumberger Geoquest, and Landmark Graphics. Thus, such applications may alternatively be used as the optimization tool of choice to link to a dynamically updated data repository, such as the DSM 100 system described above.

An information management system comprising components such as the DSM 100, Optimizer 160, and ProCast 140 can be used to manage information for any type of assets or groups of assets to give the business unit the capability to better manage and allocate resources for a large portfolio having various components defined and developed by a plurality of different individuals. In the case of a hydrocarbon-producing portfolio, optimization of the portfolio and forecasting of production are greatly enhanced by developing a system which results in the collection of data required for both these systems as part of a daily work routine. This type of system provides an efficient method for obtaining data in near real-time which reflects the most current portfolio of prospects, interpretations of reservoir characteristics, and estimated costs of drilling and completing wells in the prospect inventory.

By developing a database management system which accepts related data from all function groups and an optimization tool which seamlessly connects to the data repository system, data availability, which was an arduous task in the prior art, is now close to a non-event, being effectively built into the normal daily work process. As a result, the effective management of the portfolio is streamlined and the organization no longer has to slow down for the collection of portfolio data, since an inventory of future prospects and their expected performance characteristics are continuously stored and updated in the data repository system. Additionally, using this information management system, the impact of changing optimization criteria can be quickly evaluated, and "what-if" scenarios can be generated quickly. Further, the financial performance and production volumetric impacts of using more or fewer drilling rigs can be quickly seen, and how many wells need to be drilled to achieve a certain net-cash low requirement, and what is needed to reach a certain gas-production plateau can all be quickly determined.

Advantageously, embodiments of the invention may provide an integrated process and software system able to drive and facilitate the efficient, effective, and live transfer of information, data, and knowledge among and between multiple business team members of an organization both within the office and remotely located in field operation environments. Embodiments of the invention may also be used to provide a more consistent application of various business rules and principles among the multiple business team members throughout the organization. Additionally, embodiments of the invention may provide consistency in data and information formatting throughout an organization by providing a uniform data platform that can be used throughout the organization or; alternatively, by providing a system which involves the usage of various data platforms by multiple business team members and communication of data between the platforms. Embodiments of the invention may also provide the ability to historically track changes in information, data, and knowledge used in analyzing past results to determine new changes necessary in the decision making processes to improve future business results. These are only examples of advantages that may be provided by specific embodiments. It should be understood that the invention is not limited to any particular advantages.

While the invention has been described with respect to exemplary embodiments, those skilled in the art will appreciate that other embodiments may be devised which do not depart from the spirit of the invention. Accordingly, the scope of the invention should be limited only by the following claims.

What is claimed is:

1. A management system for a hydrocarbon-producing portfolio, comprising:
    at least one server providing a plurality of applications to respective users, at least one of the applications generating hydrocarbon-producing portfolio data corresponding to the respective user, at least some of the hydrocarbon-producing portfolio data generated by at least one of the applications having a key parameter field therein;
    a database management system operatively coupled to the at least one server and storing at least some of the hydrocarbon-producing portfolio data generated by at least one of the plurality of applications and update any of the stored hydrocarbon-producing portfolio data having the key parameter field when ones of the plurality of applications modify any of the stored hydrocarbon-producing portfolio data having the key parameter field; the at least one server to serve the updated hydrocarbon-producing portfolio data to any other ones of the plurality of applications when the other ones of the plurality of applications retrieves the updated hydrocarbon-producing portfolio data having the key parameter field, the management system further updating data on a property in a real time environment based on input from multiple users using different programs for different tasks; and
    at least one business process model application to apply a business process model to selected ones of the stored hydrocarbon-producing portfolio data to generate modeled hydrocarbon-producing portfolio data having the key parameter field, the at least one business process model application to automatically update the modeled hydrocarbon-producing portfolio data when any ones of the selected ones of the stored hydrocarbon-producing portfolio data are updated by operation of any of the other applications;
    wherein the business process model comprises creating an optimized drilling schedule.

2. A management system for a hydrocarbon-producing portfolio, comprising:
    at least one server providing a plurality of applications to respective users, at least one of the applications generating hydrocarbon-producing portfolio data corresponding to the respective user, at least some of the hydrocarbon-producing portfolio data generated by at least one of the applications having a key parameter field therein;
    a database management system operatively coupled to the at least one server and storing at least some of the hydrocarbon-producing portfolio data generated by at least one of the plurality of applications and update any of the stored hydrocarbon-producing portfolio data having the key parameter field when ones of the plurality of applications modify any of the stored hydrocarbon-producing portfolio data having the key parameter field; the at least one server to serve the updated hydrocarbon-producing portfolio data to any other ones of the plurality of applications when the other ones of the plurality of applications retrieves the updated hydrocarbon-producing portfolio data having the key parameter field, the management system further updating data on a property in a real time environment based on input from multiple users using different programs for different tasks; and
    at least one business process model application to apply a business process model to selected ones of the stored hydrocarbon-producing portfolio data to generate modeled hydrocarbon-producing portfolio data having the key parameter field, the at least one business process model application to automatically update the modeled hydrocarbon-producing portfolio data when any ones of the selected ones of the stored hydrocarbon-producing portfolio data are updated by operation of any of the other applications; wherein the business process model comprises forecasting hydrocarbon production for a selected drilling schedule.

3. A method for managing information, comprising:
    serving a plurality of applications to respective users, each of the plurality of applications generating hydrocarbon-producing portfolio data corresponding thereto, at least some of the hydrocarbon-producing portfolio data generated having a key parameter field therein;
    storing the hydrocarbon-producing portfolio data generated by at least one of the applications;
    updating any of the hydrocarbon-producing portfolio data having the key parameter field when ones of the plurality of applications is used to modify any of the stored hydrocarbon-producing portfolio data having the key parameter field;

updating data relating to a prospect in a real time environment on the basis of input from multiple users using different programs for different tasks;

serving the updated hydrocarbon-producing portfolio data to any other ones of the plurality applications when said other ones of the plurality of applications retrieves from storage the hydrocarbon-producing portfolio data having the key parameter field;

applying at least one business process model to selected ones of the stored hydrocarbon-producing portfolio data to generate modeled hydrocarbon-producing portfolio data; and automatically updating the modeled hydrocarbon-producing portfolio data when selected ones of the stored hydrocarbon-producing portfolio data are updated by operation of any one of the served applications wherein applying the business process model comprises creating an optimized drilling schedule based on a selected criterion.

4. A method for managing information, comprising:

serving a plurality of applications to respective users, each of the plurality of applications generating hydrocarbon-producing portfolio data corresponding thereto, at least some of the hydrocarbon-producing portfolio data generated having a key parameter field therein;

storing the hydrocarbon-producing portfolio data generated by at least one of the applications;

updating any of the hydrocarbon-producing portfolio data having the key parameter field when ones of the plurality of applications is used to modify any of the stored hydrocarbon-producing portfolio data having the key parameter field;

updating data relating to a prospect in a real time environment on the basis of input from multiple users using different programs for different tasks;

serving the updated hydrocarbon-producing portfolio data to any other ones of the plurality applications when said other ones of the plurality of applications retrieves from storage the hydrocarbon-producing portfolio data having the key parameter field;

applying at least one business process model to selected ones of the stored hydrocarbon-producing portfolio data to generate modeled hydrocarbon-producing portfolio data; and automatically updating the modeled hydrocarbon-producing portfolio data when selected ones of the stored hydrocarbon-producing portfolio data are updated by operation of any one of the served applications wherein applying the business process model comprises forecasting hydrocarbon production for a selected drilling schedule.

5. A method for managing a hydrocarbon-producing portfolio, comprising:

having a plurality of asset team members each using an application related to the function of the respective asset team member to generate hydrocarbon-producing portfolio data relevant thereto; the asset team members comprising a geoscientist who initiates the portfolio data and at least one of, a landman, a reservoir engineer, a regulatory compliance administrator, a right-of-way administrator, a drilling engineer, a completion engineer, a finance analyst, a field operator, a sales and marketing representative, and a portfolio manager;

automatically updating corresponding hydrocarbon-producing portfolio data used by any other one of the applications based on the hydrocarbon-producing portfolio data generated by using at least one of the applications; and applying at least one business process model to select ones of the corresponding hydrocarbon-producing portfolio data wherein the applying at least one business process model comprises determining an optimized drilling schedule.

6. The method according to claim 5, wherein the optimized drilling schedule is determined based on at least one selected from product price forecasts and production predictions.

7. The method according to claim 6, wherein the optimized drilling schedule is determined based on a selected criterion comprising at least one selected from developing most profitable assets first, achieving a selected net cash flow, achieving a selected earnings, achieving a selected level of production, satisfying obligations on time, and developing assets to achieve the greatest net cash flow in a selected amount of time for a selected amount of capital.

* * * * *